United States Patent [19]

Woffinden et al.

[11] Patent Number: 4,612,612

[45] Date of Patent: Sep. 16, 1986

[54] VIRTUALLY ADDRESSED CACHE

[75] Inventors: Gary A. Woffinden, Scotts Valley; Donald L. Hanson, Los Altos Hills; Gene M. Amdahl, Atherton, all of Calif.

[73] Assignee: Amdahl Corporation, Sunnyvale, Calif.

[21] Appl. No.: 527,678

[22] Filed: Aug. 30, 1983

[51] Int. Cl.[4] .......................... G06F 9/32; G06F 9/36
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,825,904 | 7/1974 | Burk et al. | 364/200 |
| 3,902,164 | 8/1975 | Kelley et al. | 364/200 |
| 4,010,451 | 3/1977 | Kibble et al. | 364/200 |
| 4,218,743 | 8/1980 | Hoffman et al. | 364/200 |
| 4,253,145 | 2/1981 | Goldberg | 364/200 |
| 4,376,297 | 3/1983 | Anderson et al. | 364/200 |
| 4,400,770 | 8/1983 | Chan et al. | 364/200 |
| 4,441,155 | 4/1984 | Fletcher et al. | 364/200 |
| 4,453,230 | 6/1984 | Mizoguchi et al. | 364/900 |
| 4,456,954 | 6/1984 | Bullions et al. | 364/200 |

*Primary Examiner*—David Y. Eng
*Attorney, Agent, or Firm*—Fliesler, Dubb, Meyer & Lovejoy

[57] ABSTRACT

Disclosed is a data processing system including virtual-addressed and real-addressed stores. One store is addressed with real addresses and the other store is addressed with virtual addresses. Whenever an addressed location is to be accessed in a store addressed by the other type of addresses, the address is translated to the other type of address. If a virtual address cannot access the desired location in the virtual store, the virtual address through a virtual-to-real translator is translated to a real address and the location is addressed in the real store. Whenever a real address needs to access a virtual address location in the virtual-addressed store, the real address is converted through a real-to-virtual translator in order to locate corresponding locations in the virtual-addressed memory.

11 Claims, 6 Drawing Figures

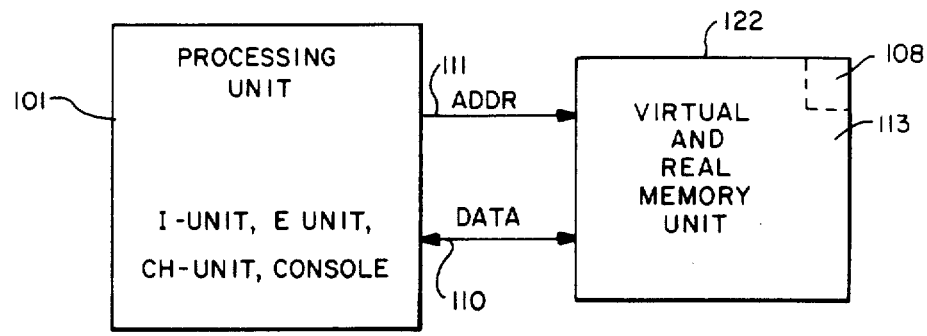
FIG.—1
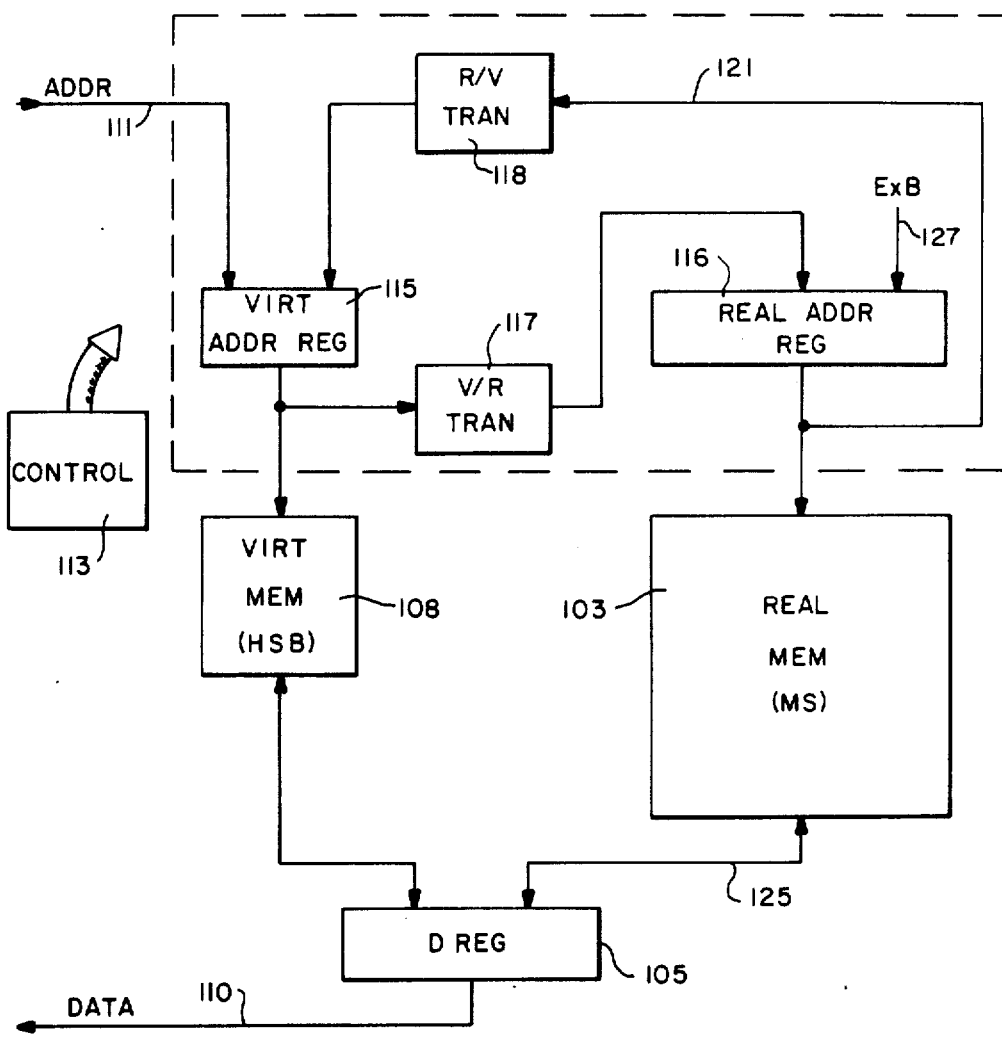
FIG.—2

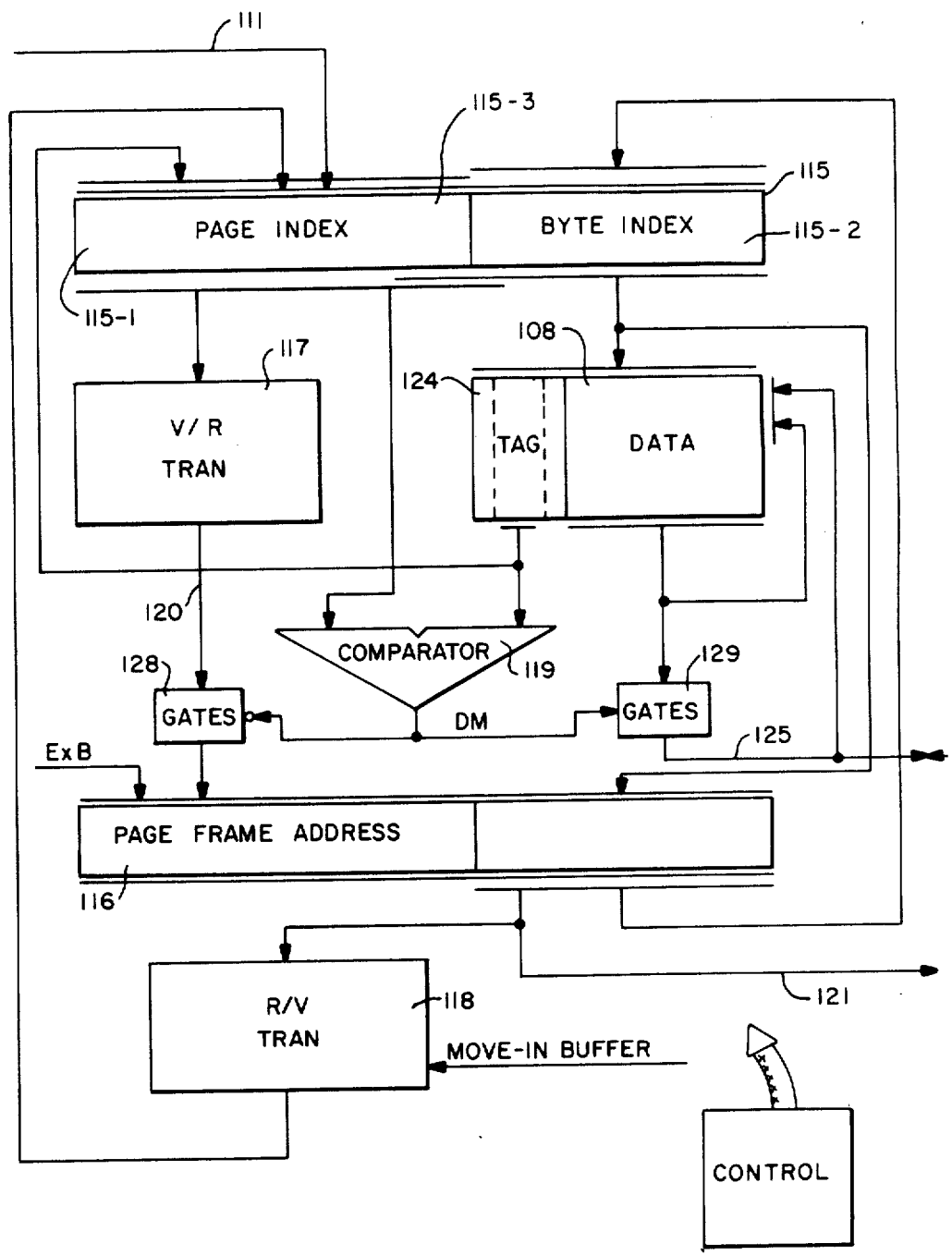
FIG.—3

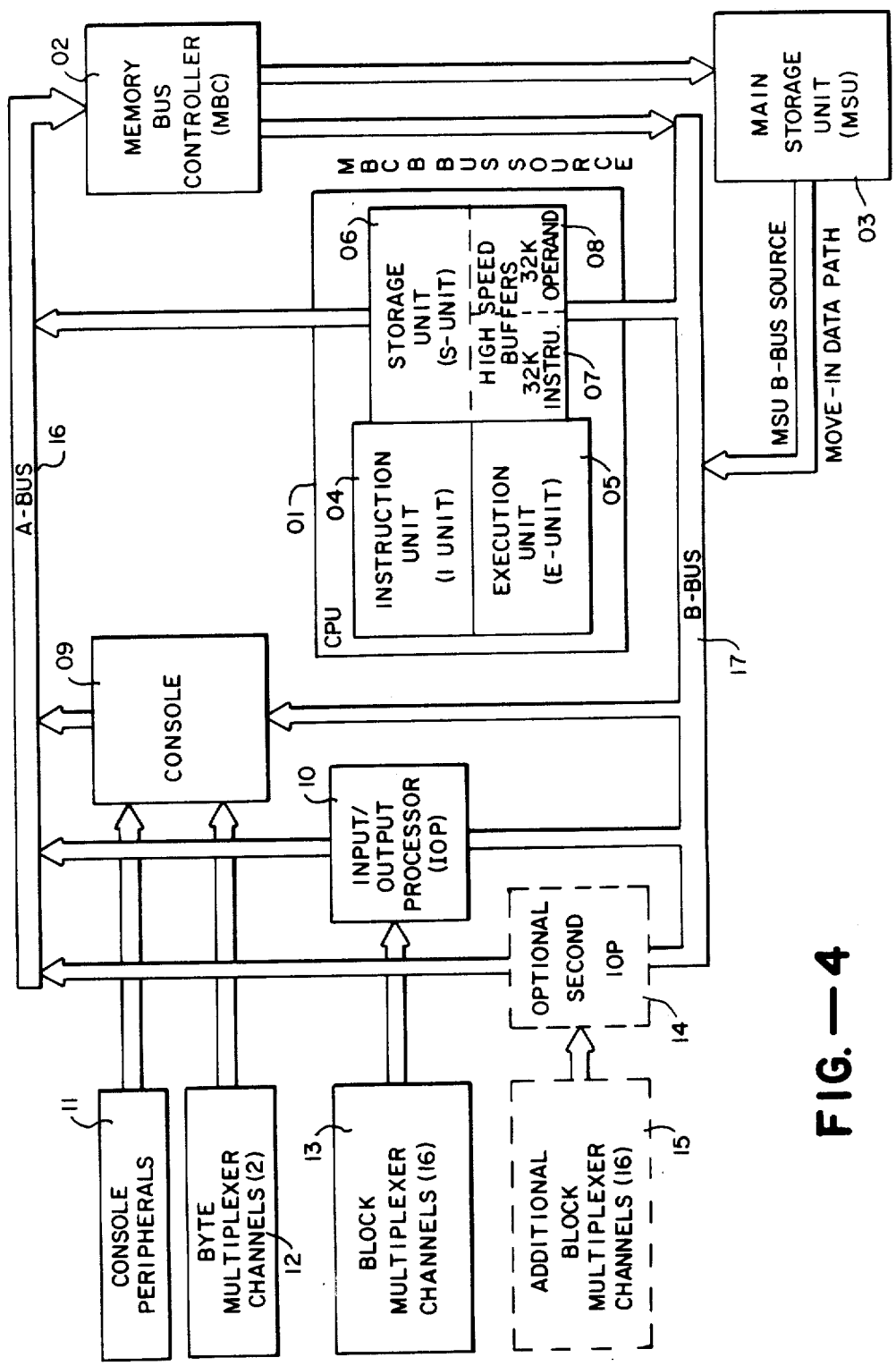
FIG.—4

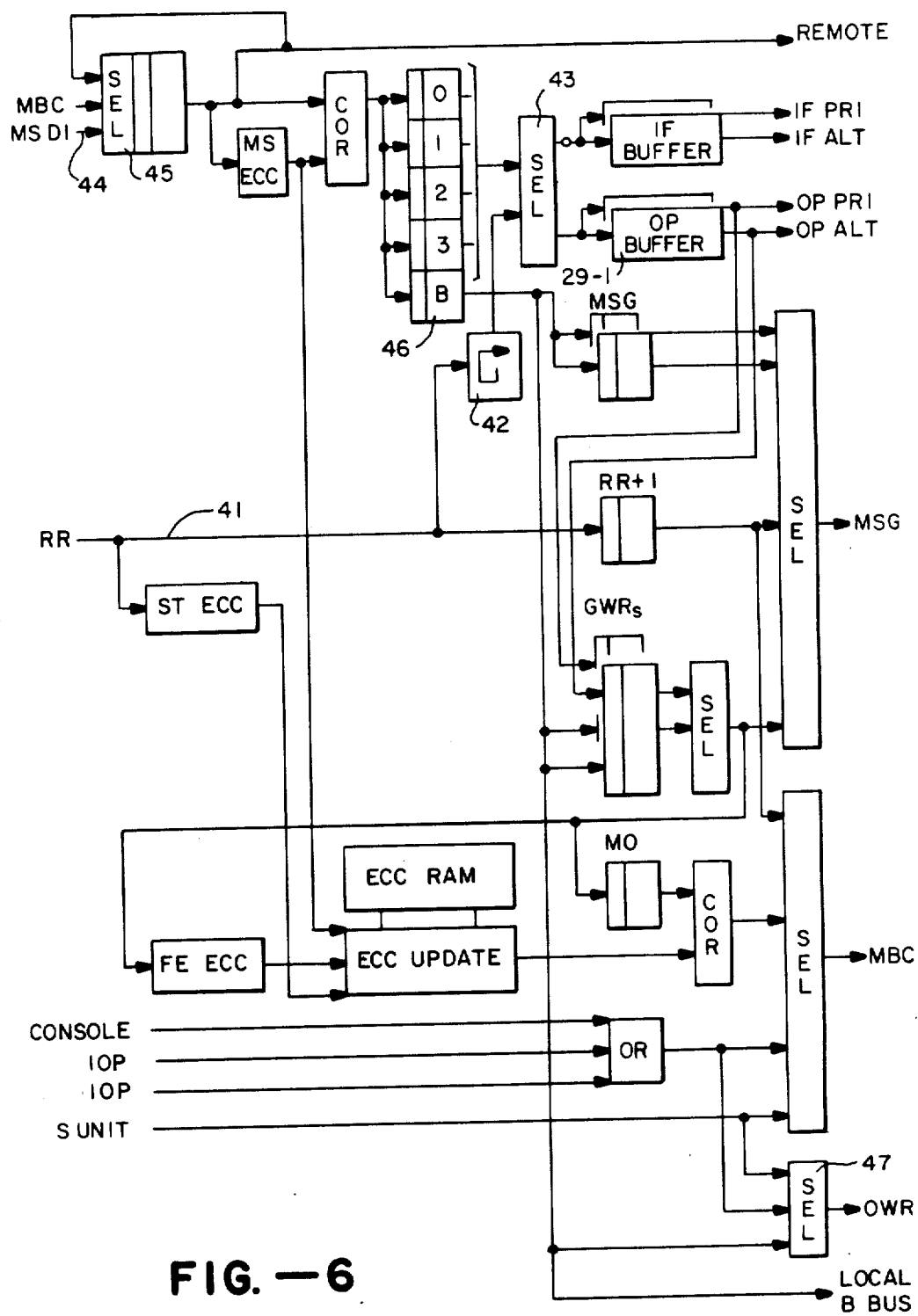
FIG.—6 ced Cache

VIRTUALLY ADDRESSED CACHE

BACKGROUND OF THE INVENTION

The present invention relates to the field of instruction controlled digital computers and specifically to methods and apparatus associated with storage units in data processing systems.

Recent data processing systems have been designed with virtual storage in which different user programs are operable in the system. The programs identify storage locations with logical addresses. The logical addresses are translated dynamically to real addresses during the processing of instructions. Dynamic address translation is particularly important in multi-programming environments since different programs are free to use the same logical addresses. To avoid interference, the system must translate logical addresses, which are not unique, to real addresses which are unique for each executing program.

In order to provide for the uniqueness of the real addresses when non-unique logical addresses are employed, translation Tables which are unique for each program are provided. The translation Tables are typically stored in main storage. The accessing of the translation Tables in main storage, however, requires a significant amount of time which can degrade system performance. In order to enhance the performance when translations are made, it is desirable to store translated information in high-speed buffers in order to reduce the number of accesses to main storage.

It is common in data processing systems to have a memory hierarchy wherein buffer memories (caches) of relatively low capacity, but of relatively high speed, operate in cooperation with main memories of relatively high capacity but of relatively low speed. It is desired that the vast majority of accesses, either to fetch or store information, be from the buffer memory so that the overall access time of the system is enhanced. In order to have the vast majority of accesses come from the relatively fast buffer memory, information is exchanged between the main memory and the buffer memory in accordance with predetermined algorithms.

In virtual storage, multi-programming systems, it is also desirable to store information in the buffer memory to reduce accesses to main store. In addition to real addresses of data and the data itself, the buffer memory stores logical addresses and program identifiers. With this information in the buffer memory, relatively more time consuming accesses to main storage for the same information are avoided.

The efficiency with which a buffer memory works in decreasing the access time of the overall system is dependent on a number of variables. For example, the capacity of the buffer memory, the capacity of the main store, the data transfer rate between stores, the replacement algorithms which determine when transfers between the main store and buffer are made, and the virtual to real address translation methods and apparatus.

In prior art systems, the address space of the buffer memory and the main store has been the real address space. Therefore, each virtual address from a program required address translation in order to access either the buffer or main store.

There is a need for improved buffer memory systems which are particularly suitable for virtual storage and for multi-programming data processing systems. Specifically, there is a need in such systems for memory hierarchies which have improved methods and apparatus for managing data transfers and for increasing the efficiency of operation.

SUMMARY OF THE INVENTION

The present invention is a data processing system including virtual-addressed and real-addressed stores. One store is addressed with real addresses and the other store is adressed with virtual addresses. Whenever an addressed location is to be accessed in a store addressed by the other type of addresses, the address is translated to the other type of address. If a virtual address cannot access the desired location in the virtual store, the virtual address through a virtual-to-real translator is translated to a real address and the location is addressed in the real store. Whenever a real address needs to access a virtual address location in the virtual-addressed store, the real address is converted through a real-to-virtual translator in order to locate corresponding locations in the virtual-addressed memory.

In one embodiment of the present invention, a data processing system has a comparatively low capacity, high-speed virtual-addressed buffer memory and a comparatively high capacity, slow-speed real-addressed main store. The memory hierarchy is organized as a virtual storage system in which programs define storage locations using logical addresses. Logical addresses can be either real addresses or virtual addresses. When a program specifies an access using a logical address, the logical address accesses the buffer directly if the logical address location is resident in the buffer.

If the logical address location is not resident in the buffer, the mainstore is addressed with the real address to access the addressed location. If the logical address is a virtual address, the virtual address is translated to a real address before mainstore is addressed.

With this hierarchy, the efficiency with which the buffer memory decreases the access time of the overall system is enhanced since, for accessed locations in the buffer, no virtual-to-real translation is required.

The buffer typically contains a small fraction of the mainstore data at any time. In the virtual-addressed buffer, the location of the data is not a function of mainstore real addresses, but is a function of the virtual addresses. Therefore, mainstore addresses do not map to unique buffer addresses. More than one real address can be translated to the same virtual address location in the buffer.

In one particular embodiment, subsets of data located in the buffer are identified by page addresses. Page addresses are stored in the buffer memory along with the data. When a requesting page address attempts to access the buffer, the page address, called a tag, stored in the buffer, is compared with the requesting page address. If the requesting and stored page addresses match, the addressed data location is resident in the buffer. If a requesting and stored page addresses do not match, then the desired data location is not resident in the buffer.

Since different virtual addresses may specify the same data location that corresponds to a single real address location in mainstore, it is possible that the virtual-addressed buffer will store more than one copy, called a synonym, of the same data at different locations. For this reason, a real-to-virtual translator translates mainstore real addresses to all buffer virtual addresses to locate buffer resident synonyms when modified data is stored into the buffer.

In accordance with the above summary, the present invention achieves the objective of providing an improved virtual storage and multi-programming data processing system.

Additional objects and features of the invention will appear from the following description in which the preferred embodiments of the invention have been set forth in detail in conjunction with the drawings.

BRIEF DESCRIPTION OF THE DRAWINGS

FIG. 1 depicts a block diagram of a data processing system having virtual-addressed and real-addressed stores.

FIG. 2 depicts a block diagram of the virtual and real memory unit which forms part of the FIG. 1 system.

FIG. 3 depicts a block diagram of the translation mechanism which forms part of the memory unit of FIG. 2.

FIG. 4 depicts one particular embodiment of the FIG. 1 data processing system which utilizes virtual and real memory.

FIG. 6 depicts a schematic block diagram of the data paths utilized in the virtual and real memory unit within the FIG. 4 system.

DETAILED DESCRIPTION

Figure 5:
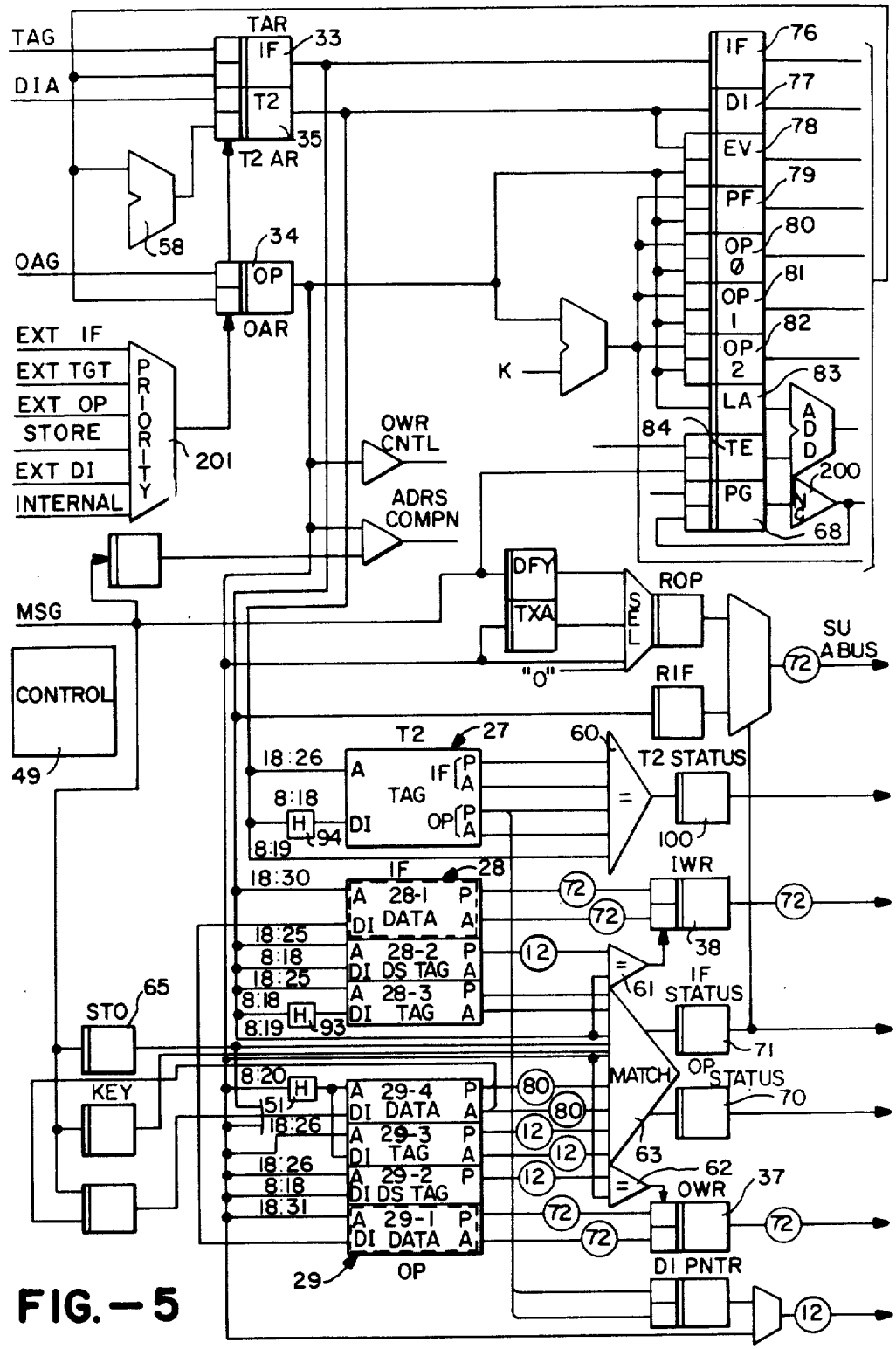
FIG. 5 depicts a block diagram of the addressing mechanism of the FIG. 4 system which includes the virtual-to-real translation of the present invention.

In FIG. 1, a virtual and real storage unit 122 connects with a processing unit 101 to form a data processing system. The storage unit 122 includes a virtual memory 108 which is typically a high-speed buffer 122 and a real memory 103 which is typically a mainstore. The storage unit 122 connects to the processing unit 101 with an address bus 111 and a data bus 110.

In FIG. 2, further details of the virtual and real memory 122 are shown. The high-speed buffer 108 is addressed by virtual addresses which are latched into a virtual address register 115. Virtual addresses are received from the processing unit 101 on bus 111. Data for access from or to the high speed buffer 108 appears in a data register 105. The data register 105 connects to and from the processing unit 101 by the data bus 110.

In FIG. 2, the mainstore 103 is addressed by addresses in the real address register 116. The real address register 116 is loaded with a real address which is output on bus 120 from the virtual-to-real (V/R) translator 117. The translator 117 translates virtual address in register 115 to real address in address register 116.

The virtual-to-real translator 117 functions whenever a virtual address in register 115 does not have an address which corresponds to an address location resident in the buffer 108. Whenever the requested address does not correspond to a location resident in the buffer, the translator 117 translates the virtual address to a real address and the requested address accesses the real address location in mainstore 103.

The virtual to real translator 117 is, in one example, the mechanism defined in the IBM System/370 Principles of Operation. One such implementation is found in the well-known Amdahl 470 System.

Whenever access is made to the mainstore 103, a corresponding virtual address access is thereafter made in the buffer 108 so that buffer 108 has the same data at a virtual address as the mainstore 103 has at a real address. Thereafter, if the newly requesting virtual address again addresses the buffer 108 with a virtual address in register 115, the virtual addressed location will be resident in buffer 108. Since the buffer 108 contains only a subset of the data in the mainstore 103, it is frequently necessary to move out data from the buffer 108, at one virtual address location, and place the moved-out data in the corresponding real address location of the mainstore 103 in order to make room for the new new data in the buffer 108. The move out from buffer 108 frequently occurs when data is moved into buffer 108 due to a request by a program for the new data.

Because different virtual addresses from programs may refer to the same real address location in mainstore 103, the buffer 08 may also have the same data at different virtual address locations. Accordingly, mainstore real addresses do not map uniquely into a single virtual address.

In order to know what virtual address in buffer 108 corresponds to a real address in mainstore 103, the real-to-virtual (R/V) translator 118 translates real addresses in register 116 to virtual addresses in register 115. The translator 118 will provide one or more virtual addresses for each real address. By way of distinction, the virtual-to-real translator 117 will map one or more virtual addresses in buffer 8 into a single real address in the mainstore 103.

At the time of move in of data to the buffer, if additional copies called synonyms of information already appear in the buffer, then the most up-to-date copy must be identified.

All invalid data can be removed from the buffer and only the data which has been most recently modified can be allowed to remain in the buffer. When invalid data is thus removed, there is no problem of invalid data in the buffer. If all invalid copies are not removed, then there must be some way of maintaining data integrity so that only the most recently changed (modified) copy of data is the one that can be used by any program.

One way to insure data integrity, when all invalid copies are not removed, uses a validity field for each data entry in the buffer. In one example, a two-bit validity field is employed representing four different validity states. One state is "invalid", a second state is "public", a third state is "private", and a fourth state is "modified". For the invalid state, the data cannot be used for any purpose. The private state indicates that this and only this copy of the data exists and hence this copy can be used or modified at any time. For the public state, it indicates that more than one copy exists and therefore that this copy should not be modified. The modified state means that this copy has already been modified and that therefore on a move-out of the modified data, the main store data must be updated to be the same as this modified data in order to preserve data integrity.

The most up-to-date copy will be one with a validity bit which indicates that a modification has occurred. There can only be one modified copy because every time a move in is done, a search of the buffer is made to make sure that there is no other more up-to-date copy.

If data is fetched and a copy is to be stored, then all other copies of the data need to be deleted. If data is only fetched and not stored, then other copies of the data can remain in the unmodified form. In the case where a modified line is fetched from the buffer, its validity field is changed to indicate a public state and is moved back into the buffer for all synonyms making each copy (synonym) public.

In order that each copy in the buffer can be located, the real-to-virtual translator 18 translates real addresses to multiple virtual addresses. Further details of a preferred embodiment of the real-to-virtual translator 18 in FIG. 2 are described in detail in the application entitled APPARATUS FOR REVERSE TRANSLATION Ser. No. 528,091, filed: Aug. 30, 1983, and the application entitled APPARATUS FOR ENHANCING SEARCHES OF DATA TABLES Ser. No. 527,675, filed Aug. 29, 1983, both assigned to the same assignee as the present invention and incorporated by referance herein.

Other alternative ways to do reverse translation are also possible. One alternative is to serially search through all buffer addresses and find all synonyms. The problem with that alternative is that it takes a lot of time to serially search every location, and the time penalty would be excessive for an efficient machine.

Another alternative uses reverse translation Tables where each Table entry represents one synonym in the buffer. The number of synonyms is a limited number, for example four, thereby limiting the searching time for synonyms.

In FIG. 2, control unit 113 is a conventional microcode or other sequential logic controller for controlling the various elements of the FIG. 2 system.

In FIG. 3, further details of an implementation of a virtual-addressed buffer are shown. Virtual addresses appear on the bus 111 and are stored in the virtual address register 115. Virtual address register 115 includes a high-order page index portion 115-1 and a low-order byte index 115-2. The page index 115-1 is typically a virtual address while the byte index 115-2 is the same for both virtual and real addresses. A field 115-3 is a part of the page index 115-1.

In FIG. 3, buffer 108 stores data and has a corresponding TAG portion 124. The TAG field 124 identifies the data in a corresponding data field in buffer 108. Whenever the buffer 108 is addressed by the byte index and page index 115-2, the data from buffer 108 and the corresponding TAG from tag store 124 are accessed. The accessed TAG is read out from the addressed location to the comparator 119. At the same time, the virtual address from the page index register 115 is also input to the comparator 119. If the TAG from the tag store 124 and the requesting TAG from the page index register 115-1 match, that is the compare is equal, then the output from comparator 119 indicates a data match (DM). The data match signal from comparator 119 indicates that the logically addressed data location in the buffer store 108 is resident in the buffer 108. When resident in the buffer 108, no virtual-to-real translation is required. When a data match occurs, the DM signal from comparator 119 enables the gates 129 to provide the data on bus 125. Bus 125 connects to the data register 105 in FIG. 1. If no data match occurs from comparator 119, then the virtual-to-real address from translator 117 provides the real address. The real address is gated by gates 128 to the page frame address register 116 and bus 121 to the main store 103 of FIG. 2.

The real address on bus 121 addresses the real memory 103 in FIG. 2 and provides the real data in the data register 105. The real data in register 105 is returned to the virtual memory 108 at the same virtual address location as specified by the virtual address register 115. This virtual address is the same virtual address that was originally translated by translator 117. Because that virtual address may not be the only virtual address which stores the data moved in from the real address location in the real memory 103, the real-to-virtual translator 118 performs real-to-virtual translations to identify any other virtual addresses. The real-to-virtual translator 118 then forms any other virtual addresses corresponding to the real address in the page frame address register 116. All of the virtual address locations in the buffer 108 corresponding to a real address in the register 116 are examined. If the data exists in any modified form in any buffer location, that modified data is returned to the buffer as the requested data and the modified data updates the data in main store. If modified data is not found, then data in main store at the real address is returned to the buffer 108 as the requested data.

In order to determine whether or not a data location in the buffer corresponds to a real address, a tag comparison occurs. If a tag match occurs, then all of the locations which have a match must be examined for validity.

Data from the mainstore 103 is then placed in the buffer 108 at the virtual address still resident in the register 115-1. If in storing data into the virtual-addressed buffer 108 it is necessary to remove other data stored in buffer 108 in order to make room, the virtual address of data to be removed is first stored in the page index register 115-1. The virtual-to-real translator 117 forms the real address in the register 116 for the data to be removed from the buffer 108.

In FIG. 4, a high performance data processing system including a virtual and real memory system is shown.

SECTION 0—OVERALL SYSTEM

FIG. 1 shows a block diagram of a data processing system. The system includes a central processing unit (CPU), a memory bus controller (MBC), and a main storage unit (MSU). The central processing unit 1 includes the I-unit 4, the E-unit 5, and the S-unit 6. The instruction unit (I-unit) 4 fetches, decodes, and controls instructions and controls the central processing unit. The execution unit (E-unit) 5 provides computational facilities for the data processing system. The storage unit (S-unit) 6 controls the data processing machines instruction and operand storage and retrieval facilities. The S-unit includes the instruction buffer 7 which provides high-speed buffer storage for instruction streams and the operand buffer 8 which provides high-speed buffer storage for operand data.

Other major parts of the FIG. 1 system includes one or two input-output processors (IOP) 10,14 which receives and processes input-output requests from the central processing unit 1 and provides block multiplexer channels; the console 9 which communicates with the central processing unit 1 to provide system control and byte multiplexer channels; the memory bus controller (MBC) 2 which provides main memory and bus control, system wide coordination of functions and timing facilities; and the main storage unit (MSU) 3 which provides the system with large capacity memory.

The data processing system shown in FIG. 1 employs a dual bus structure including the A bus 16 and the B bus 17. The A bus carries data from the console, the input-output processor 10, and the central processing unit 1 to the memory bus controller 2. The B bus carries data from the memory bus controller 2 and the main storage unit 3 to the console 9, the input-output processor 10 and the central processing unit 1.

STORAGE UNIT

SECTION 1—OVERVIEW

Referring to FIG. 4, The Cache Storage Unit (S-Unit) 6 provides high speed cache storage for instructions and operands. The S-Unit 6 receives and processes all requests for data (either instructions or operands) by the I-Unit 4. Virtual to real address translations are accomplished by the S-Unit, which also maintains the Translation Lookaside Buffer (TLB). Cache to mainstore data transfers necessary to honor I-Unit requests for data are initiated by the S-Unit.

The S-Unit 6 also provides the Bus interface between the I-Unit 4 and the E-Unit 5 portions of the CPU and the rest of the system.

In Section 2, the various storage arrays, which constitute the principal S-Unit resource, are described in detail. Section 3 describes the hardware which supports the addresses used in accessing the arrays and which determines the residency of data in the cache. In Section 4, the data paths necessary for reading and writing the cache, as well as routing message data, are described. Further details of the FIG. 4 system are described in the copending application entitled MEMORY SYSTEM (AMDH 3958 DEL) assigned to the same assignee of the present invention and incorporated herein by reference.

SECTION 2—ARRAYS

2.1 Introduction

The S-unit has a cache structure which provides a quantity of fast storage to buffer the currently active subset of mainstore data. This fast storage is referred to as the High-Speed Data Buffer (HSDB) and includes IF and OP buffers 7 and 8 of FIG. 4.

Referring to FIG. 5, the S-Unit 6 includes several storage arrays including a TAG 2 (T2) array 27, an instruction fetch (IF) array 28, and an operand (OP) array 29.

Since the HSDB buffers only a subset of mainstore data, it is necessary to identify the address of any data which is resident in the HSDB. The address of a byte of data may be reconstructed in three steps. First, the low-order bits (bits 19:31 of logical addresses, bits 21:31 of system absolute addresses) are determined by the data's position within the HSDB. To determine the remaining address bits, we can examine the High-Speed Tag, which contains an entry for each line (32 bytes) of storage in the HSDB. This Tag entry contains the status of the line, logical address bits 8:18, and a pointer to an entry in the Translation Lookaside Buffer (TLB). The entries in the TLB are page-specific and hold the most recent translations from logical addresses to system addresses. The TLB entry for a page (4K bytes) tells us the addressing mode of the page (virtual or real), bits 0:11 of the logical address, the STO for virtual pages, and system absolute address bits 4:20. Data cannot reside in the HSDB unless the TLB contains an entry for that data's page.

In order to enhance the reliability of the S-Unit, error correction capability has been included in the Operand HSDB. Associated with this function is the High-Speed Operand ECC Array (ECC Array).

2.2 High-Speed Data Buffer

The High-Speed Data Buffer, buffers 7 and 8 in FIG. 1, reduce the apparent mainstore 3 access time by holding currently active instructions and operands in a fast-access storage array, that is in buffers 7 and 8.

2.2.1 Organization

The HSDB facility contains two caches of 32K bytes each, one is the INSTRUCTION FETCH (IF) cache 28, and the other is the OPERAND ACCESS (OP) cache 29. The IF and OP caches 28 and 29 are similar as far as organization and addressing are concerned. Henceforth the term "cache" will refer to either of the buffers 7 and 8.

Each cache is set-associative, with a set size of two. The two associativities are called, Primary (Pri,P) and Alternate (Alt,A), although they are equivalent in function.

Each cache contains 512 addressable sets. Each set consists of two lines (Pri or P, Alt or A). Each line consists of four consecutive quarter lines (QL). Each quarter line consists of 8 consecutive bytes (B). Each byte consists of 8 bits and one parity bit. A line of data, therefore, consists of 32 consecutive bytes, beginning on a 32-byte boundary.

Associated with each line is a Tag, stored in Tag arrays 28-2 and 29-2 and duplicated in T2 array 27, where each holds addressing and status information for the line; the Tags are described separately, below. In the IF cache 28 each Tag is shared between even-odd pairs of sets, effectively creating pseudo-64-byte lines in order to reduce Tag storage requirements.

2.2.2 Addressing

The HSDB, along with the rest of the S-Unit, accesses data by a logical address (either virtual or real) known to the executing program, not by the system absolute address known to mainstore.

The OP, IF and T2 caches are independently addressed. Address bits 18:26 of the instruction address from IF address register 33, the operand address from the operand address register 34 select one of the 512 sets from the appropriate cache. All lines which have the same address bits 18:26 in their logical addresses will map into the same set of a cache. Address bits 27:31 comprise the byte index, which selects the beginning byte within the 32-byte lines of the addressed set.

2.2.3 Operational Capabilities

2.2.3.1 Fetches

In the OP Cache 29, fetches are allowed on any byte boundary and can be of any length from 0 to 8. If the desired bytes reside within a single line, the fetch may complete in one access. If the fetch requires data from two distinct lines (line crosser, LX), a separate access is required to access data from each of the two lines. During a fetch, both Pri and Alt associativities are accessed concurrently, with selection between the two determined by the results of Data Select Match 62,64 of Data Select Tags (DS TAG) 28-3,29-3 associated with the Tag. The DS TAGS are stored in the DS TAG arrays 28-3 and 29-3.

There is an eight-byte-wide (72 bits including parity) data path coming out of each of the two, P and A, associativities of a cache. Any eight consecutive bytes (mod 32) within a line may be fetched at once. The position of a byte within the eight-byte data path depends upon bits 29:31 of the byte's address, not upon those bits of the request address. For example, a fetch to address 2D would yield, from each associativity, bytes 30 31 32 33 34 2D 2E 2F, not bytes 2D 2E 2F 30 31 32 33 34.

The receiving unit (e.g. OWR register 37 or IWR register 38), in addition to selecting between Pri and Alt, rotates the data into proper alignment and latches the desired bytes.

In the IF Cache, fetches are constrained to halfword boundaries, since all instructions not on this boundary result in a specification error. The memory array for the IF cache has the same capabilities as the OP cache; however, the Data Paths provide only halfword rotation.

2.2.3.2 Stores

Stores are done only to the OP cache. A Data Integrity Unit in MBC of FIG. 4 will remove all other copies of the line from the IF and OP caches before the store is done.

To do a store, two pipeline passes are needed: a fetch pass, which serves to verify the existence of the line of data in the cache, that it is the only copy of data residing in any cache, and to determine which associativity it is in, and a store pass, which actually stores the data. The fetch pass of a store is similar to a fetch access as described above, and the store pass differs only in that data-in and write strobes are supplied to the bytes of the array which are to be written. Store data is supplied by an eight-byte-wide data path from the Result Register (not shown) of RR bus 41 of FIG. 6 into the OP cache, including a rotator 42 and selector 43 for proper alignment of data. The Result Register is the output register of the E-Unit 5 of FIG. 4.

Line-crossing stores require a separate fetch and store pass for each of the two lines involved.

2.2.3.3 Move-ins

In FIG. 6, a 32-byte-wide data path (MS? DI) 44 to selector 45 is shared by both OP and IF caches for Move-ins of new lines into either cache from Mainstore. The MSDI? register is loaded from an 8-byte data in path in four successive cycles.

2.2.3.4 Move-outs

Since the OP cache 8 is operated as a Store-to device, modified lines of data must be returned to Mainstore 3 when their storage in the OP cache 8 is vacated. This is accomplished by doing four successive eight-byte accesses to the line and routing the fetched data to Mainstore 3.

2.3 Operand ECC Array

Modified lines in the OP cache 8 contain the only valid copy of their data. To enhance reliability single-error-correction, double-error-detection capability (ECC) has been implemented in the OP cache. The checking-block size is eight bytes, i.e. a Quarterline. Each Quarterline of data in the OP cache is associated with 13 check bits: the eight byte-parity bits, a four-bit check character which is a function of the 64 data bits, and a parity bit over that check character. The byte-parity bits are part of the OP HSDB described above. The four-bit check character can be thought of as a Hamming encoding of the eight-bit longitudinal redundancy check (LRC) of the eight data bytes; the LRC itself need not be saved. The LRC character is an eight-bit character. Each bit is the parity over one bit position of all eight bytes in the quarterline. The check character, together with its parity bit, is stored in the Operand ECC Array, which has one five-bit field for each quarterline of the OP cache. On each fetch or store access, the check characters for the addressed Quarterline and for the next Quarterline (wrapped around within the line) are accessed; in this way the ECC logic can keep the check characters updated even in the event of Quarterline-crossing stores. A check character is stored along with each Quarterline of a Move-in, and a Quarterline's check character is read out for use in correction with each of the four accesses of a Move-out. Correction is performed on Move-outs only; byte parity checking is done on other fetch addresses.

The OP ECC array is accessed one cycle later than the OP HSDB.

2.4 Translation Lookaside Buffer

The Translation Lookaside Buffer (TLB) 29-4 in FIG. 5 provides storage to translate virtual or real page addresses to mainstore page (system page) addresses in a single machine cycle. The TLB is divided into two parts, teh Virtual Address part (VA TLB) and the System Address part (SA TLB). The VA TLB is implemented on the S-unit while the SA TLB is implemented on the MBC. Only the VA TLB is described in this section. The TLB is organized with 256 two-way associative sets to be described below.

2.4.1 Addressing

The two associativities of the TLB are accessed concurrently by different hash functions of the OAR address. Shown below is the addressing function used to access each associativity. The numbers refer to address bit positions in the OAR.

| | | | | | | | | |
|---|---|---|---|---|---|---|---|---|
| Pri | 12 | 10 XOR 13 | 14 | 8 XOR 15 | 16 | 17 | 18 | 19 |
| Alt | 11 XOR 12 | 13 | 9 XOR 14 | 15 | 16 | 17 | 18 | 19 |

2.4.2 TLB Entry

The fields within a VA TLB entry are shown in Table 2.4.2 below and are listed with a brief explanation of their purpose.

TABLE 2.4.2

| S-UNIT TLB BIT ASSIGNMENT | | | | | | | | |
|---|---|---|---|---|---|---|---|---|
| BIT POSITION | 0 | 1 | 2 | 3 | 4 | 5 | 6 | 7 |
| | 8 | 9 | 10 | 11 | 12 | 13 | 14 | 15 |
| | 16 | 17 | 18 | 19 | 20 | 21 | 22 | 23 |
| SYSTEM ADDRESS 0 | 4 | 5 | 6 | 7 | 8 | 9 | 10 | 11 |
| | 12 | 13 | 14 | 15 | 16 | 17 | 18 | 19 |
| | 20 | * | * | * | * | * | * | * |
| SYSTEM ADDRESS 1 | 4 | 5 | 6 | 7 | 8 | 9 | 10 | 11 |
| | 12 | 13 | 14 | 15 | 16 | 17 | 18 | 19 |
| | 20 | * | * | * | * | * | * | * |
| STATUS | V0 | V1 | EP0 | EP1 | V2 | * | P/P | * |
| | F | SAM | SYS | | | | | * |
| EFFECTIVE ADDRESS | 0 | 1 | 2 | 3 | 4 | 5 | 6 | 7 |
| | * | 8 | 9 | 10 | 11 | * | 20 | * |
| SEGMENT BASE | 8 | 9 | 10 | 11 | 12 | 13 | 14 | 15 |
| | * | — | PS0 | PS1 | PES | SS0 | SS1 | * |
| SEGMENT BASE | 16 | 17 | 18 | 19 | 20 | 21 | 22 | 23 |
| | * | — | — | — | — | 24 | 25 | * |

TABLE 2.4.2-continued
S-UNIT TLB BIT ASSIGNMENT

| KEYS | K0 | K1 | K2 | K3 | K4 | C | * | * |
|------|----|----|----|----|----|---|---|---|
|      | K0 | K1 | K2 | K3 | K4 | C | * | * |

\* = parity bits
— = unused

Valid Bits (V0, V1, V2) indicate the type of entry currently occupying this slot. The Table below shows the encoding of these bits.

| V(0) | V(1) | V(2) | Meaning |
|------|------|------|---------|
| 0 | 0 | 0 | Invalid |
| 0 | 0 | 1 | Unused |
| 0 | 1 | 0 | Common |
| 0 | 1 | 1 | Virtual |
| 1 | 0 | 0 | Real |
| 1 | 0 | 1 | Unused |
| 1 | 1 | 0 | Real, Common |
| 1 | 1 | 1 | Real, Virtual |

Eviction Pending Bits (EP0, EP1)

Two eviction pending bits are stored, one for each system absolute address. If a request requires displacing a valid translation, the operation of freeing a slot in the TLB for the new translation is referred to as a TLB Eviction. Associated with the eviction is a Page Release in which all lines resident in the Data Buffer associated with the evicted page are removed. FIG. 3 shows the possible states of the Eviction Pending Bits along with the number of valid TLB entries.

The Flipper Bit (F) identifies which of the two system address fields of a TLB entry is the translation of the logical address contained in the entry. The other system address field is not used for current translations. Its use is restricted to providing the system address needed to evict lines from the buffer.

Pre/Post Purge Bit (P/P)

In the system, a TLB purge can logically be performed in one machine cycle. When a new TLB entry is made, the pre/post bit of the entry is set to the value of the system pre/post bit. When a purge TLB operation is performed, the system pre/post purge bit is toggled. The Purge TLB controller then serially updates each TBL entry to reflect any change in state required by the purge. As part of the purge update, the pre/post purge bit is written to the current value of the system pre/post purge bit. When a request accesses the TLB, the pre/post purge bit of the entry is matched against the pre/post purge bit of the system. If the bits match, there is no pending purge outstanding and the TLB entry can be used as is. If the bits do not match, there is a pending purge whose effects, if any, on the state of the TLB entry have not been reflected in the TLB entry. If this occurs, the purge is applied to the TLB entry before it is used in the Match function 63.

Address Compare Bit (AM) indicates that the system absolute address of the current entry matches the address compare address.

System/User Bit (S/U) indicates if the current translation belongs to System State software or User State software. Inclusion of this information allows partial purges of the TLB when the purge is initiated in User State.

Effective Address (E(0-11,20)) uniquely identifies the virtual page address occupying the TLB entry. The TLB holds information for a small subset of virtual pages, thus a particular entry must be distinguished from all others which could also occupy its slot in the TLB.

Segment Table Origin (ST0(8-25)) identifies the virtual address space to which a translation belongs. The Segment Table Origin uniquely identifies the translation Tables used to translate a virtual address to a system address.

Control Register 0 (CR0(8-12))

These bits identify the page size, segment size, and translation type that was used to perform this translation. The previous field defined which Tables were used and this field defines the manner in which they were used.

Protection Keys (K0(0-7), K1(0-7))

The system keys associated with each 2K page in mainstore are included in each TLB entry so that accesses for data can be checked for protection exceptions. Two key fields exist to include both keys associated with each page of a machine operating in 4K page size mode. Included in each of these 8 bit keys are the following:
Four bit key
Change bit
Fetch protect bit
Key Parity
Bus parity The first parity bit is the parity bit from mainstore. The second parity bit is the parity bit that the bus structure appends upon the byte when the message is sent from mainstore. These parity bits are used to detect errors in mainstore and the buffer, respectively.

2.5 High-Speed Tag

The High Speed Tag identifies each line of buffer-resident data with the SA field of the TLB entry which contains the system page address of the line. The SA field pointed to by the TAG provides the address should the line be moved out of the cache to mainstore.

In the OP buffer, there is one TAG for each data line. In the IF buffer, there is one tag for every pair of consecutive lines, constraining both lines of a pair to belong to the same page in system storage. In the OP and IF pipelines, the TAGs are accessed in parallel with the data.

A second copy of Op and IF TAGs is kept in the T2 array. This allows background operations to search the buffer without affecting performance in the OP and IF pipelines. In addition, this second copy can be used as a pointer to the system page address in the event that the first copy develops a parity error.

2.5.1 Tag Entry

The fields in a Tag entry are shown in the following Table 2.5.1 and thereafter are described briefly.

TABLE 2.5.1

| BIT POSITION | 0 | 1 | 2 | 3 | 4 | 5 | 6 | 7 | 8 | 9 | 10 | 11 |
|---|---|---|---|---|---|---|---|---|---|---|----|----|
| TAG1 | V0 | V1 | F | PA | 0 | 1 | 2 | 3 | 4 | 5 | 6 | * |
| TAG2 | V0 | V1 | F | PA | 0 | 1 | 2 | 3 | 4 | 5 | 6 | * |
| DATA SELECT | 8 | 9 | 10 | 11 | 12 | 13 | 14 | 15 | 16 | 17 | 18 | * |

The Pointer Field points to one SA field in the SA TLB, thus tying the line to a particular system page address. This field has three components. The TLB Index bits 0:6 in bit positions 4:10 point to an entry in each of the associativities, the Primary/Alternate Bit, P/A or PA, indicates which associativity contains the correct translation for the line, and the flipper bit, F, indicates which system absolute address is associated with this page. All these fields participate in the Data Resident Match. The seven bits of the TLB index define 128 locations, that is, $2^7$. The TLB array has 256 locations, that is, $2^8$. The eight bit for the $2^8$ locations is derived from address bit 19 directly, since address bit 19 is implicit in the location of the line in mainstore.

Valid Bits (V(0-1)) of an entry indicate the state of the data currently residing in a slot in the Data Buffer. The Valid Bits influence the Data Resident Match as well as the Buffer Replacement Algorithm. The meaning of these bits differs between the OP and the IF Tag Arrays. Shown below is the two bit encoding used in the OP Tag.

| V(0) | V(1) | Meaning |
|------|------|---------|
| 0 | 0 | Invalid |
| 0 | 1 | Public |
| 1 | 0 | Private |
| 1 | 1 | Modified |

Public indicates that other copies of this line may exist in the system. If a line is private, it is the only copy of that line. Modified means that the data line has been modified and must update mainstore when displaced from the bufer.

IF tags differ from OP tags because each IF tag services two lines in the IF HSDB. The two lines' addresses differ only in system address bits A26 and are referred to as companion lines. Each of the valid bits is associated with one of these companion lines. The bit then determines if the line is invalid or public as follows:

| V(0) | V(1) | SA26 | Meaning |
|------|------|------|---------|
| 0 | — | 0 | Invalid |
| 1 | — | 0 | Public |
| — | 0 | 1 | Invalid |
| — | 1 | 1 | Public |

2.6 Data Select Tags

The Data Select Tags are used to select between primary and alternate data supplied by both associativities of the HSDB. Since data selection is a binary decision, only the primary tags are required. There is a one to one mapping between the Data Select Tags and the Primary Data Resident Tags, thus, there are half as many IF Data Select Tags as there are OP Data Select Tags. Each data select tag entry consists of logical address bits 8-18.

2.7 Replacement Ram

Each time there is a fetch access to the Buffer, the Replacement Ram on the S-Unit is read. The Replacement Ram holds one bit for each line in the OP Buffer, and one bit for every two lines in the IF Buffer. The bit indicates which Buffer associativity was last accessed. This information is used to implement an LRU (Least Recently Used) Replacement Algorithm. When a line is about to be Moved In, the preliminary flow of an IF flow or, the OP flow which found the line missing, reads the Replacement Ram and latches the data. When the Move-In occurs, if the line does not get Data Select Match then the data is moved in to the associativity not pointed to by the latched Replacement P/A bit. If Data Select Match occurs, then the line must be moved into the associativity which matched, otherwise Data Select Match would not be able to distinguish between primary and alternate data since both would have identical data select match functions.

SECTION 3—ADDRESS PATHS

3.1 Introduction

The means for accessing data in the High Speed Data Buffer is provided by the S-Unit Address Paths shown generally in FIG. 2 and more specifically in FIG. 6. These address paths primarily provide addresses from the Instruction Unit 4 and the Data Integrity Unit in MBC 2 of FIG. 1 for accessing the high speed data caches. Other important functions related to accessing data are also included. The address paths have the responsibility for insuring that data returned at the end of an access is the requested data. This function occurs during a B-cycle and falls into several categories:

Byte Rotation Amount Generation
Data Enable Generation
Clock Enable Generation
Overlapping Storage Access Analysis
Data Select Match
Data Resident Match
Protection Check
Prefixing
Address Compare A request may not immediately complete if it is processed by a multiflow algorithm or if interlock conditions are present. If additional flows are necessary, B-cycle addresses must be retained for further processing. These addresses are held in a set of R-cycle registers (not shown) known as Address Storage Registers (ASRs).

3.2 B-Cycle Functional Description

3.2.1 Registers

The B-Cycle address path registers of FIGS. 5 and 3 provide information which is required to access the storage arrays and to properly complete the requested operation. In general, these registers can accept addresses and other request information from either the I-Unit 4 of FIG. 4, the MBC 2 of FIG. 4, or from internal S-Unit address registers. Specific input paths to each of the registers are listed with the following descriptions.

3.2.1.1 Operand Address Register (OAR)

The OAR 34 holds the address used to access the storage arrays associated with the operand pipeline. The arrays accessed with addresses in this register are the Operand Tag 29-2 (and the Data Select Tag 29-3), and the Translation Lookaside Buffer (TLB) 29-1 and OP cache 29-4.

Operand Tag Address Drive

Each associativity of the Operand Tag 29-2 and of the Operand DS TAG 29-3 is addressed with bits 18-26 of the OAR 34. This register is loaded every B-cycle from either the I-Unit OAG, an S-Unit ASR, the Translation (TR) Adder, or the OP pipe B-cycle Incrementor, according to the select code given in Table 3-1. A similar structure exists on the I-Unit to address the Operand Data Select Tag. These sourcing units are not all shown explicitly since they are not important to the present invention except as indicating that some source does exist.

TLB Address Drive and Purge TLB Counter

Each associativity of the TLB 29-4 is addressed with a different hash function, in hash unit 51, of OAR bits 8-18 (with bit 19 also used) as described in Section 2. The OAR register 34 is loaded every B-cycle from one of the above-mentioned sources, or the Purge TLB (PTLB) Counter 53, according to the select code given in Table 3-2. When the 8-bit PTLB counter 53 is selected, zeroes are forced into the appropriate four bit positions to make the TLB pointer invariant under the hash function. The control points for the counter 53 consists of an incrementor 54 and a reset line.

TABLE 3-1

| Operand Pipe Address Select Code | | | |
|---|---|---|---|
| SEL.IU | IMM.INC | OP.SEL0:2 | SELECTION |
| 0 | 0 | 000 | IF ASR |
| 0 | 0 | 001 | DI ASR |
| 0 | 0 | 010 | EV ASR |
| 0 | 0 | 011 | PF ASR |
| 0 | 0 | 100 | OP ASR0 |
| 0 | 0 | 101 | OP ASR1 |
| 0 | 0 | 110 | OP ASR2 |
| 0 | 0 | 111 | TR adder |
| 1 | 1 | XXX | B-cycle |
| 1 | X | XXX | I-Unit OAG |

TABLE 3-2

| TLB Address Select Code | | |
|---|---|---|
| SEL.1 | SEL.CNT SELECTION | |
| 0 | 0 | S-Unit |
| 0 | 1 | Counter |
| 1 | 0 | I-Unit |
| 1 | 1 | I-Unit |

3.2.1.2 Length, Justification and Rotation Amount Register (LJRR)

The LJR holds the 5-bit specification of the length and justification and the 3-bit rotation amount of the current operand pipeline access. Loaded every B-cycle, the LJR is sourced by the I-Unit, and S-Unit LJR storage register, or itself. In addition, the rotation amount may be selected from bits 29-31 of the Translation Adder. The rotation amount register actually consists of separate I-Unit and S-Unit copies which are latched and then selected into the B-cycle. This allows the I-Unit to freeze the rotate amount for algorithms such as store multiple. The capability is also provided for the S-Unit to force the rotate amount to zero for certain algorithms. The select code for the LJR is given in Table 3-3.

TABLE 3-3

| Length, Justification and Rotation Amount Select Code | | |
|---|---|---|
| SEL.SU | OP.LRJ.SEL0:2 | SELECTION |
| 0 | XXX | I-Unit |
| 1 | 000 | B-cycle |
| 1 | 001 | TR adder |
| 1 | 100 | LJR0 |

TABLE 3-3-continued

| Length, Justification and Rotation Amount Select Code | | |
|---|---|---|
| SEL.SU | OP.LRJ.SEL0:2 | SELECTION |
| 1 | 101 | LJR1 |
| 1 | 110 | LJR2 |

3.2.1.3 Store Mark Latches

The Store Mark Latches contain byte enable signals used when writing data into the operand buffer. These byte enables are generated during the P-cycle as a function of the request's length, justification and low-order address bits. The Store Mark Latches are loaded every B-cycle, according to the select code given in Table 3-4.

TABLE 3-4

| Next Store on Deck Select Code | | |
|---|---|---|
| SEL.STOR0 | SEL.STOR1 | SELECTION |
| 0 | 0 | OP ASR0 |
| 0 | 1 | OP ASR1 |
| 1 | X | OP ASR2 |

3.2.1.4 Instruction Address Register (IAR)

The IAR register 33 holds the address used to access the Instruction Cache. Each associativity of the Instruction Fetch (IF) Tag is addressed with bits 18-25 of the IAR. The IAR is loaded at the beginning of every B-cycle from the I-Unit IAG bus or an S-Unit ASR, according to the select code given in Table 3-5.

TABLE 3-5

| Instruction Fetch Pipe Address Select Code | | |
|---|---|---|
| SEL.IU | IF.SEL0:2 | SELECTION |
| 0 | 000 | IF ASR |
| 0 | 001 | DI ASR |
| 0 | 010 | PF ASR |
| 0 | 011 | EV ASR |
| 0 | 100 | OP ASR0 |
| 0 | 101 | OP ASR1 |
| 0 | 110 | OP ASR2 |
| 0 | 111 | TR Adder |
| 1 | XXX | I-Unit IAG |

Data Select Tag IAR

The DS Tag IAR may be loaded from the I-Unit IAG, from a separate IF ASR which resides on the I-Unit, or from the S-Unit OP Pipe selector (see Table 3-1), according to the selection code given in Table 3-6.

TABLE 3-6

| Data Select Tag IAR Select Code | | |
|---|---|---|
| SEL.IF.ASR | SEL.IU | SELECTION |
| 0 | 0 | S-Unit |
| 0 | 1 | I-Unit |
| 1 | X | DS IF ASR |

3.2.1.5 TAG2 Address Register (T2AR)

The T2AR register 35 register 35 holds the address used to access the Instruction Fetch TAG2 and Operand TAG2 Arrays. There are actually separate OP and IF copies of bits 18-28 of the T2AR. Each associativity of the OP TAG2 Array is addressed with bits 18-26 of the OP copy of the T2AR. Each associativity of the IF TAG2 Array is addressed with bits 18-25 if the IF copy of the T2AR. This register is loaded every B-cycle from the Data Integrity Unit in the MBC 2 or an S-Unit ASR via the TAG2 Incrementor 58, according to the select code given in Table 3-7.

TABLE 3-7

| Tag 11 Pipe Address Select Code | | |
|---|---|---|
| SEL.EXT | T2.SEL0:2 | SELECTION |
| 0 | 000 | IF ASR |
| 0 | 001 | DI ASR |
| 0 | 010 | PF ASR |
| 0 | 011 | EV ASR |
| 0 | 100 | OP ASR0 |
| 0 | 101 | OP ASR1 |
| 0 | 110 | OP ASR2 |
| 0 | 111 | TR Adder |
| 1 | XXX | DI Unit |

The TAG2 Incrementor 58 allows the line address (bits 20-26) to be reset to zero or incremented by one, for use with background Tag array searches. This function is controlled by a reset and an increment signal, with reset dominant. When the line address is all ones, a B-cycle signal is asserted to indicate the end of the search.

3.3 B-CYCLE OPERATIONS

3.3.1 Byte Rotation Amount Generation

Data which exits the OPerand Cache or the Instruction Cache via the Common Fetch Byte Paths always leaves aligned to quarterline boundaries. If the requested data begins at any other byte boundary it requires rotation in order to properly present data to the Instruction Word Registers (IWR) 38 or the Operand Word Registers (OWR) 37. Similarly, store data returning from the Result Register (RR) bus 41 over the Common Store Byte Paths is unaligned to quaterline boundaries. If the requested storage locations begin on a nonquarterline boundary, store data requires rotation in order to properly present data to the HSDB.

During the B-Cycle, the Quarterline Byte Offset and the requested Length and Justification are combined to generate rotation control signals. Fetch data and store data are rotated in opposite directions, allowing one set of control functions to indicate how both fetch data and store data should be rotated. The operand pipeline and instruction pipeline generate slightly different Rotation Amount functions for fetch data.

3.3.1.1 Operand Pipeline

The Operand Cache 29 supplies the E-Unit Operand Word Register High (OWRH) (the high-order half of OWR 37) and the Operand Word Register Low (OWRL) (the low-order half of OWR 37) with one to eight bytes of data accessed on any byte boundary. Requests of length one to three may be left or right justified within OWRH, or right justified within OWRL. Requests of length four can be put into either OWRH or OWRL. Requests of length five to seven may be left or right justified within the full doubleword OWR. Justification has no significance for requests of length eight.

The E-Unit Result Register High (RRH) and Result Register Low (RRL) supply the Operand Cache 29 with one to eight bytes of data to be stored, with the same length and justification formats described above.

The Rotation Amount is computed by subtracting the leftmost byte position of justified data from the Quarterline Byte Offset. Data to be fetched into the OWR is rotated in a left circular direction by this amount, whereas data to be stored from the RR is rotated in the opposite direction by the same amount.

3.3.1.2 Instruction Pipeline

Data returned from the Instruction Cache 28 must also be rotated. This function is combined with the IWR bubble up mechanism which is controlled by the I-Unit. Stores to the Instruction Cache are now allowed.

3.3.2 Data Enable Generation

3.3.2.1 Operand Pipeline

An access to the Operand Cache 29 always places eight bytes of data on the Common Fetch Byte Paths output from OWR 37. Since requested operand data can be of any length between zero and eight, byte-specific data enables must be generated to select the proper bytes into the Operand Word Register 37. Bytes which are not enabled by these signals have zeros or pad characters loaded into their positions in the OWR. If all the data is confined to OWRH, then the data enables for OWRL are "don't cares."

3.3.2.2 Instruction Pipeline

Since the I-Unit maintains validity status on each halfword in the IWR complex and remembers how many valid halfwords are expected from the Instruction Cache 28, the S-Unit does not need to supply data enables for instruction data.

3.3.3 OWR Clock Enable

During a normal access to the Operand Cache, only one pipeline flow is required to provide the requested data to the OWR complex. Under these conditions all byte positions in the OWR are clocked identically and the Data Enables determine which byte positions receive data and which receive zeros or pad characters.

During a Line Crosser access (which requires two pipeline flows for completion) a situation arises in which we need to independently clock each byte position in the OWR which receives S-Unit data. The first pipeline flow provides data to the OWR which receives S-Unit data. The first pipeline flow provides data to the OWR in the same manner as a normal data fetch. During the second flow, S-Unit data is selectively loaded into the OWR such that required bytes from the end of the first line are not overwritten. These byte-specific Operand Clock Enables are functions of the Line Crosser Flags, the Quarterline Byte Offset, the Length, and the Justification.

3.3.4. Overlapping Storage Access Analysis

As with other systems which incorporate pipelined operations to increase throughput, certain program sequences require the detection of multiple accesses to the same storage locations in order to insure that the actual execution matches the conceptual execution. The common case is when the requests are a store followed by a fetch to the same location. If this occurs a Store-Fetch interlock (SFI) is generated so that the correct data is fetched after the store has completed.

In the S-Unit 6, the detection of overlapping storage accesses occurs in parallel with each B-cycle access. The operand pipeline analysis is byte specific and detects overlapping accesses of all combinations of fetches and stores currently active within the S-Unit. The instruction pipeline analysis is line specific and detects pending stores that may modify instructions that are not yet buffered in the I-Unit. This mechanism, in conjunction with analysis performed by the I-Unit to cover its own instruction buffer, detects all stores into the instruction stream (STIS). The results of the analysis influence Data Resident Match for both the operand pipeline and the instruction pipeline.

In addition to detecting store-fetch overlap, the Overlapping Storage Access Analysis assures that references to potential operand synonyms are detected. The process of detecting overlapping accesses falls into two distinctive stages:
  obtaining addresses which describe the locations accessed, and
  comparing these descriptions with one another.

The locations accessed are described by generating the beginning and the ending address of each access. During a normal non-line crossing access, the beginning address is available directly from the OAR 34 while the ending address is generated by adding the length of the current B-cycle access to the OAR. Since any one pipeline flow can provide data from only one line in the Cache, the ending address calculation need only include the low order five bits of the beginning address.

Line crossing accesses generate a carry out of bit position 27, but these requests require two separate pipeline in this situation of the locations accessed during the first flow are bounded by the end of the line, while those accessed during the second begin at the second line boundary. Ones or zeros are forced into the low order five bits of the appropriate address before any comparisons occur.

At the end of the B-Cycle, the addresses are latched for comparison with later flows. Associated with each operand port are SFI Overlap Registers where the beginning and ending low-order five address bits are saved. The comparison between these address descriptions of the accessed locations is divided into several portions as follows:
  Byte Overlap
  Line Overlap
  Page Overlap An interface exists that allows the I-Unit to control the operand SFI mechanism during out-of-order store (OOS) sequences. A set of OOS and Loop Number flags are provided by the I-Unit with each operand request. The OOS flag, when associated with a store, indicates that the store is out-of-order. When associated with a fetch it indicates that conditional SFI analysis should be performed as a function of Loop Number match. If conditional analysis is specified and a loop number match exists between two requests SFI is inhibited to prevent a hang condition.

3.3.5 Operand Pipe Incrementor

The OP Incrementor 54 allows the contents of the OAR to be incremented by the various amounts which are required for certain algorithms. Table 3-8 shows the encoding of the Incrementor control signals.

TABLE 3-8

| Operand Pipe Incrementor Control | |
|---|---|
| CON0:3 | INCREMENT AMT |
| 0000 | 16 Mod 64 |
| 0001 | 16 |
| 0010 | — |
| 0011 | 16 Mod 32 |

TABLE 3-8-continued

| Operand Pipe Incrementor Control | | |
|---|---|---|
| 0100 | 32 Mod 64 | |
| 0101 | 32 | |
| 0110 | — | |
| 0111 | — | |
| 1000 | 8 Mod 64 | |
| 1001 | 8 | |
| 1010 | — | |
| 1011 | 8 Mod 32 | |
| 1100 | 0 | |
| 1101 | 64 | |
| 1110 | 2048 | |
| 1111 | 4096 | |
| ADRS.SIZE | OSRS31 | ADDRESS MODE |
| 0 | 0 | 32 bit |
| 0 | 1 | 31 bit |
| 1 | X | 24 bit |

3.3.6 Data Select Match

At the beginning of an access to the Operand Cache 29 or the Instruction Cache 28, the requested data may reside in either one of the two associativities. Before data can be loaded into the destination register, a decision as to which associativity contains the data must be made. Data Select Match refers to the function which selects between data returned by the primary (P) and the alternate (A) associativities. Data Select Match is the output from the IF comparator 61 or from the OP comparator 62.

The most salient characteristic of Data Select Match from comparator 61 or 62 is that it must be fast enough to select data from one or the other associativity for loading into the destination register (either OWR 37 or IWR 38) regardless of whether the requested data does or does not reside in the HSDB. As explained later, the actual presence of the requested data in the HSDB is the responsibility of Data Resident Match from Comparator 63, which is not known in time to perform the selection. In one embodiment, the Data Select Match function physically resides on the I-Unit in order to eliminate the MCC crossing which would otherwise be incurred between the EAG and the B-cycle address registers.

Since the Data Select Match selection is binary, only one associativity needs testing for the presence of the requested data. When the test indicates presence, control signals select data from this associativity. When the test does not indicate presence, data from the other associativity is selected. In addition, OSRs exist which allow the selection to be forced either way.

For both the IF and OP pipeline, the test involves matching the Effective Address Field of a TAG entry for the primary associativity with bits 8-18 of the requesting address. Since bits 0-7 of the request address and address space identifiers do not participate in the match, two different lines which map to the same slot in the HSDB and have bits 8-18 in common cannot be distinguished by data select match. The Buffer Line Replacement algorithm is biased by Data Select Match to assure that this situation does not occur.

3.3.7 Data Resident Match

Since the HSDB contains only a subset of addressable data, the presence of the requested data in the Operand Cache 29 or the Instruction Cache 28 must be determined. This function, referred to as the Data Resident Match, is composed of two parts. The TLB Match function from TLB array 29-4 indicates whether the requested virtual page is allowed to have accessible lines resident in the buffer. The Tag Match function from tag array 28-2 or 29-2 indicates if the requested line of data within that page does reside in the cache. Both TLB and TAG match must be present to indicate that the requested line is in the cache.

3.3.7.1 TLB Match, Operand Pipe

The process of determining whether the translation for a particular page exists in the TLB involves comparing the requesting address with information stored in the TLB 29-4. Information contained in each associativity of the TLB is independently compared with the requesting address since the translation could reside in either one. The requesting address consists of the Effective Address, the Segment Table Origin, Page Size, Segment Size, and System/User bit.

The manner in which TLB match is constructed is determined by the state of the entry's valid bits. Each state of the valid bits selects a different subset of the TLB entry components previously described in Section 2. A TLB match occurs when there is a match with each of the selected TLB entry components. A real entry requires match on only the System/User bit, and the Effective Address of a real request. A common entry matches only with a virtual request and must match on DAT parameters, System/User Bit, and Effective Address. A virtual entry matches only with a virtual request and all components of the request address must match the TLB entry.

TLB Status Match

The TLB status match function is confined to the first two bytes of the TLB entry, which comprise the status field. The following conditions must exist to yield a match:

1. The entry must be valid.
2. The Virtual/Real status of the request must match that of the entry.
3. The System/User bit must match.
4. The Pre/Post Purge bit must match, unless the request is not subject to the current purge type.

Purge Match

When a TLB purge is initiated, the purge type is recorded in the Purge Match Register, and the Pre/Post Purge bit is toggled. The Purge Match Register contains a two-bit encoding of the purge type (see Table 3-9) for single user purges. A match for a given associativity results when the following conditions are met:

1. The entry is pre-purge; its pre/post purge bit differs from the current Pre/Post Purge bit.
2. The entry type must match the current purge type. If a purge match occurs, the TLB entry is not allowed to match.

TABLE 3-9

| TLB Purge Type Code | | |
|---|---|---|
| PDMN.IN | VIRT.IN | PURGE TYPE |
| 0 | 0 | All |
| 0 | 1 | System Virtual |
| 1 | 0 | User |
| 1 | 1 | User Virtual |

Status Save Register (SSR)

The Status Save Register (SSR) saves the information necessary to update the first byte of the TLB status field for certain operations. This includes the valid bits, the eviction pending bits, the pre/post purge bit and the purge match bit. Either the primary or alternate TLB entry and associated purge match bit may be selected into this register. The register in turn feeds a selector which modifies the data appropriately, and presents it to be written back into the TLB. The selector functions and associated control are described in Table 3-10.

TABLE 3-10.

| | TLB Status Byte Selector Operation | | | | | |
|---|---|---|---|---|---|---|
| | | TLB ENTRY | | | | |
| +SEL.CODE:3 | PURG.MTCH | V0:3 | EP0* | EP1* | P/P | Parity |
| 101 (NEW) | X | W | O | V | W | G |
| 001 (IPTE) | X | O | V | S | W | G |
| 010 (PTLB) | 1 | O | 1 | S | W | G |
| 010 (PTLB) | 0 | S | S | S | W | G |
| 110 (EVCT) | X | S | O | S | S | G |
| 001 (RST) | X | O | O | O | S | G |

LEGEND:
W — New value is written
S — Current value (saved in SSR) is rewritten
V — If current entry is valid a '1' is written, otherwise current value is rewritten
G — Parity is generated
*Only the case for a flipper bit of zero is shown. If the flipper bit were a one these two columns would be reversed.

TLB EFFECTIVE ADDRESS MATCH

Bits 0–11 and 20 of the requesting address in the OAR are matched against both the primary and alternate TLB entry. Bits 12–19 are implicit in the TLB address. In 4K pagemode a match is forced on bit 20, because in this case it is a real address bit.

Effective Address Register

The Effective Address Register is loaded from the OAR and saves the effective address bits which are written into the TLB when a new entry is made.

TLB DAT PARAMETERS MATCH

The current DAT parameters, which include the segment size, page size, and entry size, are matched against the corresponding field in the primary and alternate TLB entry. These bits are held in the CR0 Match Register, which also provides the data into the TLB when making a new entry. It is loaded from the S-Unit copy of bits 8–12 of Control Register 0.

TLB STO MATCH

The current contents of the STO Match Register 65 are matched against the STO field of the primary and alternate TLB entry. The STO Match Register also provides the data into the TLB when making a new entry. It is loaded from the S-Unit copy of Control Register 1, bits 8-25.

3.3.7.2 TLB Match, Instruction Pipe

Unlike the operand pipeline, the instruction pipeline does not have direct access to the TLB. Sequential instruction fetch (1 fetch) requests normally rely on the IF TLB to provide translation information. The IF TLB is composed of two registers, IF TLB 0 and IF TLB 1, which contain a summary of the OP TLB entry for the currently active instruction stream 0 page and instruction stream 1 page, respectively.

The IF TLB registers contain the following information:
* Valid bit (V)
* TLB P/A bit (P/A)
* TLB Flipper bit (F)
* Virtual Address bit 20 (VA 20)
* Virtual/Real bit (V/R)
* System/User bit (S/U)
* System Page address (SA)
* Protection Exception bit (PX)
* Address Match bit (AM)

If TLB match occurs when the following conditions are met for the selected IF TLB:
1. If TLB V is on
2. If TLB VA 20 matches the requesting VA 20
3. If TLB V/R matches the requesting V/R
4. If TLB S/U matches the requesting S/U Condition 1 guarantees that there is a valid entry in the operand TLB for the instruction page and that the IF TLB is an accurate summary of that entry.

Condition 2 prevents IF TLB match when the instruction stream crosses a 2k address boundary. Crossing a 2k address boundary implies a new protection key block which requires revalidation of the PX bit.

Conditions 3 and 4 detect state changes in the sequential IF stream requiring re-validation of the IF TLB.

If IF TLB match occurs, then the SA is the system page address for the requesting instruction address, PX and AM are accurate status summaries, and F is the flipper bit to be used in IF Tag match.

If IF TLB match does not occur, then the IF TLB must be revalidated. If TLB validation is accomplished by simultaneously accessing the OP and IF pipelines, and saving the results of OP TLB match in the appropriate IF TLB register.

Target Fetch requests always access both OP and IF pipelines and always validate the appropriate IF TLB register for subsequent IF accesses.

If TLB V is reset whenever the IF TLB information may be inaccurate, to force a revalidation.

IF TLB V is reset in the following cases:
When the CPU protection key value is changed After an SSK which changes the key in storage After any change in the translation parameters When the OP TLB entry is purged or displaced from the TLB

3.3.7.3 TAG Match, Operand Pipe

During the B-cycle access of the OP pipe, tag entries from the primary and alternate associativities are matched against the requesting address. There are three parts to OP TAG Match:
1. The entry must be valid. In the case of a fetch pass store, it must be private (modifiable) or modified.
2. The TLB Primary/Alternate (P/A) bit in each entry selects either the primary or the alternate hashed address for comparison with the pointer field of that particular TAG entry.
3. The Flipper bit in each TAG entry is compared with the Flipper bit from the TLB associativity selected by that entry's TLB P/A bit.

3.3.7.4 Tag Match, Instruction Pipe

In the Instruction Cache there are two buffer lines associated with each tag entry. To determine tag validity, effective address bit 26 is used to select the tag valid bit for the requested line (the other valid bit being for the companion line). In all other respects IF TAG match in the instruction pipe is identical to OP TAG match.

3.3.8 Protection Check

The S-Unit performs two types of protection checking:
Low Address Protection
Storage Key Checking

3.3.8.1 Low Address Protection

Low Address Protection (LAP) is provided as described in the IBM 370 Principles of Operation. A protective exception is posted if the LAP facility is active and a store to an address in the range from 0 to 512 is detected (OAR bits 0–22 are all zeroes).

3.3.8.2 Storage Key Checking

The S-Unit retains three CPU keys used for key checking:
System State Key
User State Key
Test Protect Key The I-Unit, when issuing a request, specifies which key to compare against the key fields stored in each of the accessed TLB entries. In 4K page mode, the even or odd TLB key will be selected for comparison, based on effective address bit 20. In 2K page mode both TLB key fields contain the key associated with the 2k page. A protection exception is asserted for a given TLB associativity if key checking is active and the following conditions prevail:
1. The request is a Fetch to a page which is fetch-protected, a Store, or a Test Protect.
2. The CPU key is non-zero.
3. The CPU key does not match the TLB key.

Data into the TLB key field may be selected from several sources, which are described below. The control of this selection is summarized in Table 3-11.

The Mainstore Key Register is used to initially make the TLB entry, and to update the key on an SSK. The low-order byte contains the odd key and the high-order byte contains the even key, or the updated key in the case of an SSK. This register is loaded via the S-Unit message path, from the GWRs for a new TLB entry, and from the RR+1 Register for an SSK.

There are three identical OP Key Registers, corresponding to each of the three OP ports; (see section 3.4.1.1). Each such register holds the three bits from each associativity of the TLB which reside in the same RAM block as the change bit. This allows these bits to be restored to the TLB when the change bit is written to a '1' during a store operation.

3.3.9 Prefixing

Prefixing is provided as outlined in the IBM 370 Principles of Operation. Implementation of this function involves prefix match, zero match, prefix selection.

3.3.9.1 Prefix Match

The current system prefix is held in the System Prefix Register, and the current user prefix is held in the User Prefix Register, which constitutes an S-Unit copy of System Register 0. These registers are loaded from the RR+1 Register via the S-Unit message path. The contents of bits 0-19 of the appropriate register are matched against the corresponding bits of the OAR. In the case of 24 bit addressing a match is forced on bits 0-7.

TABLE 3-11

TLB Key Data Write Control

| Input Data Selection: | | | | |
|---|---|---|---|---|
| MSO:1 | OPA:B | PRIM | EVEN_KEY | ODD_KEY |
| 1 | X | X | Even MS Reg | Even MS Reg (even 2K page, or SSK) |
| 2 | X | X | Odd MS Reg | Odd MS Reg (odd 2K page) |
| 3 | X | X | Even MS Reg | Odd MS Reg (4K page) |
| 0 | n | 0 | Alt Opn Reg | (set alt chng bit) |
| 0 | n | 1 | Pri OPn Reg | Pri OPn Reg (se pri chng bit) |

(where n=0, 1 or 2)
Key Block Selects and Write Enables:

| WRT.TLB | WRT.SELO:1 | WE.KEY1:2 | OAR_20 | FORC_20 | KEY.BS1:2 |
|---|---|---|---|---|---|
| 0 | X | 00 (not enabled) | X | 1 | 11 (both) |
| 1 | 0 | 11 (new TLB entry) | 0 | 0 | 01 (even) |
| 1 | 1 | 11 (SSK) | 1 | 0 | 10 (odd) |
| 1 | 2 | 00 (not enabled) | | | |
| 1 | 3 | 01 (set chng bit) | | | |

3.3.9.2 Zero Match

The contents of OAR bits 0-19 are checked for all zeroes. In the case of 24 bit addressing the high-order byte is guaranteed to contain zeroes.

3.3.9.3 Prefix Selection Mechanism

Based on Prefix Match, Zero Match, and certain control signals, the prefix mechanism will select the OAR, the current Prefix, or all zeroes in generating bits 0-19 of the absolute address. Control of the prefix mechanism is summarized in Table 3-12.

3.3.10 Address Compare Match

Address Compare is provided as outlined in the IBM 370 Principles of Operation. The Address Compare Address is held in the Address Compare Register, which is an S-Unit copy of System Register 10. It is loaded via the S-Unit message path from the RR+1 Register.

TABLE 3-12

Prefix Mechanism Control

| EN.PFX | FRCEO | FRCE.PFX | PFX.MTCH | ZERO.MTCH | SEL.PREFO:1 |
|---|---|---|---|---|---|
| 0 | X | X | X | X | 3 (OAR) |
| 1 | 1 | X | X | X | 2 (Zeroes) |
| 1 | 0 | 1 | X | X | 1 (Prefix) |
| 1 | 0 | 0 | 0 | 0 | 3 (OAR) |
| 1 | 0 | 0 | 0 | 1 | 1 (Prefix) |
| 1 | 0 | 0 | 1 | 0 | 2 (Zeroes) |
| 1 | 0 | 0 | 1 | 1 | 3 (OAR) |

3.3.10.1 Effective Address Compare Match

The Address Compare Register bits 0-26 are matched directly against the corresponding bits of the OAR and the IAR. Address Compare bits 27-31 are compared with the beginning and ending address of the current IF and OP request to determine if they lie within the range thus defined. In addition, the IF pipe subtracts bits 29-30 of the starting address from the corresponding Address Compare bits to yield a code indicating which of the four halfwords fetched produced a match.

3.3.10.2 Absolute Address Compare Match

If Absolute Address Compare is selected, then match is forced over bits 0-19 of the effective address, as well as bit 20 if 2K page size is in effect. In place of these bits the Address Match (AM) bit from the matching associativity of the OP and IF TLB is used during the R-cycle to construct Absolute Address Compare match for the OP and IF pipe, respectively. The Address Compare function for the remaining low-order bits is the same as that described above (see section 3.3.10.1).

3.4 R CYCLE FUNCTIONAL DESCRIPTION

3.4.1 Address Storage Registers (ASRS)

When a requested operation cannot be completed in one pipeline flow, all the information which characterizes the request must be held for further processing. The S-Unit Address Storage Registers (ASRs) provide storage for all addresses associated with the requests currently in progress.

3.4.1.1 Operand ASRs (OP0, OP1, OP2)

The OP ASRs are associated only with the operand algorithms. These registers are loaded directly from the OAR or the OP Pipe Incrementor, according to the load enable code given in Table 3-13.

TABLE 3-13

OP ASR Load Enable Code

| Op.REG.ENBL.CNTLO:1 | Meaning |
|---|---|
| 0 | Load OP0 |
| 1 | Load OP1 |
| 2 | Load OP2 |

TABLE 3-13-continued

| OP ASR Load Enable Code | |
|---|---|
| Op.REG.ENBL.CNTLO:1 | Meaning |
| 3 | none |

Addresses of operand requests which must wait for completion because of an interlock condition are retained here as well as store addresses which are held until store data becomes available from the E-Unit. Three OP ASRs are necessary to make it possible for the three-stage S-Unit pipeline to accept I-Unit OP requests at the maximum rate of one every cycle.

3.4.1.2 Length, Justification and Rotate Amount Storage Registers

These registers (LJR0, LJR1, LJR2) correspond to the three OP ASRs, and serve to retain the specification of length, justification and rotate amount for their respective operand requests. They are loaded from the LJRR, with the same load enable code used for the OP ASRs (see Table 3-13).

3.4.1.3 Store-Fetch Interlock Overlap Registers

These registers (SF10, SF11, SF12), which are each associate with an OP ASR, contain the address of the beginning and ending bytes in the quarterline to be accessed by the request. These values are used for Store-Fetch Interlock analysis. The Length Addition performed in the B-Cycle provides the only inputs. The load enable code given in Table 3-13 also applies to these registers.

3.4.1.4 Instruction ASR

Retains the address of the last Instruction Cache access for the purpose of recycling the request if it doesn't complete. Only one storage register is provided because the I-Unit has enough instruction buffering to keep its pipeline full without accessing the IF cache every cycle. The IF ASR is loaded from the IAR.

3.4.1.5 Prefetch ASR

The Prefetch ASR is used to store addresses for various multiflow algorithms whose functions include:
operand prefetching
instruction prefetching
operand potential page crossers
processing of unsolicited messages The input to the Prefetch ASR comes from the TAG2 Address Register (T2AR) and the OP Pipe Incrementor.

3.4.1.6 Data Integrity ASR

The Data Integrity ASR retains addresses associated with Data Integrity (DI) algorithms. This register is loaded from the T2AR during the initial flow of a DI request. No storage is provided for address bits 0-7.

3.4.1.7 Eviction ASR

The Eviction ASR retains addresses which are used to search through the cache during an eviction. The address is used to release lines as required. Inputs are provided by the OAR and the T2AR. No storage is provided for address bits 0-7.

3.4.2 MBC ADDRESS INTERFACE

3.4.2.1 A-Bus Out Register

The A-Bus Out Register is the source of all S-Unit addresses to be placed onto the A-Bus. The A-Bus Out Register is actually composed of two registers, an operand pipe A-Bus register and an instruction pipe A-Bus register, one of which they may then be selected onto the bus. The operand A-Bus register is loaded in the R-cycle from the Translation Exception Address Register (TXA) or the OAR via the prefix mechanism. The instruction A-Bus register is also loaded in the R-cycle and is sourced by the IAR.

3.4.2.2 Moveout Pointer Register (MOPR)

The MOPR contains the operand TAG entry accessed by the current flow. The contents of this register are used to generate a TLB pointer to the Data Integrity Unit when a swap moveout is required. During swap move-outs the virtual address of the line to be displaced is not available, thus the TAG pointer must be used to access the system address. The MOPR may be loaded from either the TAG1 or TAG2 arrays. If a parity error is encountered in either array, the entry from the other may be used to perform moveouts.

3.5. R-CYCLE OPERATIONS

3.5.1 A-Bus Address Selection

The A-Bus Out Register is actually composed of two registers, one loaded with the B-cycle address in the instruction pipe. Once loaded, the request that gains bus access must have its address selected onto the bus. This function is performed in the R-cycle and is a function of request type, resource availability, and Data Resident Match.

3.5.2 Buffer Replacement

An LRU Buffer Replacement Algorithm is implemented for both the IF and OP caches.

3.5.2.1 Replacement RAM Update

The OP Replacement RAM address Register is loaded every cycle with bits 18-26 of the OAR. If a given valid access found the desired line resident in the buffer, the hot/cold bit is set to indicate which associativity contained the line. On a movement access the hot/cold bit is written to point to the other associativity. In this way current LRU information is maintained for each primary/alternate pair of lines.

3.5.2.2 OP Replacement Algorithm

If an OP Buffer access finds the line missing, then the Replacement algorithm is invoked to determine which associativity to replace. Replacement may be forced to primary or alternate under OSR control, which has the highest precedence.

Next, there are certain constraints involving the Data Select function, due to the requirement that two lines with the same Data Select Match function cannot occupy both associativities of a buffer set. To avoid such a situation, the algorithm is biased as follows:
1. Do not replace alternate with a line that matches the Data Select Tag.
2. Do not replace primary if the resulting Data Select Tag entry will match on a request to the alternate line (determined from Alternate Tag Pointer Match and a subset of TLB Effective Address Match).

3. Any ambiguity due to parity errors should be handled in a manner consistent with the above two rules.

If the above constraints do not apply then Replacement points to either the cold associativity as determined from the OP Replacement RAM, or to a random associativity. The choice between LRU or random is under OSR control.

3.5.2.3 If Replacement Algorithm

OSRs to force Replacement to primary or alternate and to select between LRU and random also exist for the IF buffer, with the force term predominant. The results of this analysis are stored in one of four latches, based on the BOM ID of the request. This saved replacement information may be overridden by the results of an IF Data Select analysis like that described above for the OP buffer, which is performed during the R-cycle of the preliminary flow of the IF move-in return. The results of this latter analysis are latched in case move-in deferral is enabled.

3.5.3 TLB Replacement

When a new TLB entry is required, TLB replacement logic determines if there is an available System Address (SA) field in the addressed TLB set to receive the new system address. A SA field is available if it is not being used by a valid translation already, and if it does not have its associated Eviction Pending bit set. If there is one or more available SA fields in the addresses TLB set, the TLB replacement chooses one for replacement.

3.6 Translator

The Translator maps Virtual Addresses to Real Addresses using Dynamic Address Translation as specified by the IBM 370 Principles of Operation. Facilities exist in the Translator for extended (31-bit) addressing specified by IBM. The Translator receives direct requests from the OP pipe during the following conditions
- the CPU is operating in Virtual Addressing Mode and the translation is missing from the TLB.
- a Load Real Address (LRA) instruction is executed, or
- an Invalidate Page Table Entry (IPTE) instruction is executed.

The Translator provides the only address path from the A-Bus into the S-Unit. Because of this, the Translator must be captured to process any unsolicited messages received by the S-Unit that require an address.

3.6.1 Inputs

For Virtual to Real translation requests from the OP pipe, the Translator uses the following information:
Primary Segment Table Origin (STO) from Control Register 1 (CR1) or Secondary Segment Table Origin from Control Register 7 (CR7)
Page Size, Segment Size, and the Translation type bit form Control Register 0 (CR0)
Virtual Address to be translated
Opcode (type of translation required)

3.6.2 Registers

LOGICAL ADDRESS REGISTER (LAR)

A 32-bit register which holds the Virtual Address during Virtual to Real translations. The Virtual Address held in the LAR consists of three fields: the Segment Table Index, Page Table Index, and Byte Index. The exact bit positions comprising each field depend on the Segment Size, Page Size, and Addressing Mode (24 or 31 bit addressing) in effect when the translation is requested. FIG. 3-2 shows the LAR fields for the various combinations of these parameters.

TABLE ENTRY REGISTER (TER)

A 32-bit register which holds the various Table entries used during a translation. The contents of TER depend on what phase of a translation is in progress and, for Page Table Entries, the Entry Size (either 16 or 32 bits) specified with the request. In the first phase of a translation, TER is loaded with the STO (or STE in the case of IPTE). During Segment and Page Table lookups, the correct word or half word is loaded into TER from data returned from the op-cache. Two byte page Table Entries require an additional shift beyond half word select in order to align the Page Address field properly. Sixteen bit PTEs are right shifted one byte, so that PTE bits 0–15 are loaded into TER bits 8–23. In this way PTE bit 0, which is bit 8 of the Page Address, is aligned with bit 8 of TER. FIG. 3—3 shows the TER contents for different Table entries, entry sizes, and page sizes.

TRANSLATION EXCEPTION ADDRESS REGISTER

Used to hold the virtual address of the request that caused a translation exception. This is the address that is stored during a status switch as defined by the IBM 370 Principles of Operation.

3.6.3. Translator Control

TRANSLATOR CONTROL CODE

Defines one of four states to indicate what function the Translator is performing. The states are:
STE Access—form STE address from STO and Segment Table Index
PTE Access—form PTE address from STE and Page Table Index
Prefix—form Real Address from PTE and Byte Index
Transfer—just pass an address from the TER to the Prefetch port

DAT TYPE

A pair of latches used to define one of three states to indicate what type of translation is being performed. The states are:
IPTE—Invalidate Page Table Entry
LRA—Load Real Address
CPU—Implicity DAT The DAT Type, the state of the translation, and the control parameters (PS, ES, SS), determine the fields selected from the LAR and TER into the address adder.

PORT ID

A code to define for whom the translator is currently performing a task.

EXCEPTION LATCHES

Used to accumulate the six types of exceptions that may be encountered during a translation. The six exceptions are:
Segment Table length Page Table length
Segment invalid
Page invalid
Addressing
Specification The translator will accumulate these exceptions and indicate to the pipe when an exception has been detected. The pipe will then release the requesting port from the translator wait state and the request will come down the pipe. When the translator detects a match between the pipe port ID and the port ID it has stored, it will present the exception information, if any, and becomes free.

COMMON LATCH

Used to store the fact that the current translation is for a page in a common segment. The Translator will retain this information and present it to the pipeline during the flow that makes the TLB entry.

Note that the Translator only holds latches to indicate what flow it is currently performing. It is the pipeline's responsibility to determine the next flow for the Translator to peform.

FIG. 3-2. Logical Address Register Contents

| | | | | segment size | page size | address size |
|---|---|---|---|---|---|---|
| /////// | SX | PX | BX | 64kB | 44B | 24 bits |
| 0      8 | 16 | 20 | 31 | | | |
| / 000 | SX | PX | BX | 64k | 4k | 31 |
| 0 1  4 | 16 | 20 | 31 | | | |
| /////// | SX | PX | BX | 64k | 2k | 24 |
| 0      8 | 16 | 21 | 31 | | | |
| / 000 | SX | PX | BX | 64k | 2k | 31 |
| 0 1  4 | 16 | 21 | 31 | | | |
| /////// | SX | PX | BX | 1M | 4k | 24 |
| 0      8 | 12 | 20 | 31 | | | |
| / | SX | PX | BX | 1M | 4k | 31 |
| 0 1 | 12 | 20 | 31 | | | |
| /////// | SX | PX | BX | 1M | 2k | 24 |
| 0      8 | 12 | 21 | 31 | | | |
| / | SX | PX | BX | 1M | 2k | 31 |
| 0 1 | 12 | 21 | 31 | | | |

FIG. 3-3. Table Entry Register Contents

| | | | | entry | ES | PS |
|---|---|---|---|---|---|---|
| Length | Seg Table Addr | /////// | | STO (CR1) | 2B | — |
| 0     8 | | 26 | 31 | | | |
| | Seg Table Addr | ///// | Length | STO (CR1) | 4 | — |
| 0 1 | | 20 | 25   31 | | | |
| len //// | Page Table Addr | P C I | | STE | 2B | — |
| 0   4  8 | 29  31 | | | | | |
| / | Page Table Addr | I C len | | PTE | 4B | — |
| 0      8 | | 28   31 | | | | |
| 0 | | 12    15 PTE bits | | | | |
| /////// | Page Addr | I E A /////// | | PTE | 2B | 4kB |
| 0     8 | | 20  23   31 | | | | |
| 0 | | 13   15 PTE bits | | | | |
| /////// | Page Addr | I O /////// | | PTE | 2B | 2kB |
| 0     8 | | 21  23   31 | | | | |
| 1 | | 20   22 PTE bits | | | | |
| / | Page Address | O I P O/////// | | PTE | 4B | 4kB |
| 0 1 | | 20  22  24  31 | | | | |
| 1 | | 21 22    PTE bits | | | | |
| / | Page Address | I P O   /////// | | PTE | 4B | 2kB |
| 0 1 | | 21 22   24  31 | | | | |

BUFFER ACCESSING

First Op Buffer Request—TLB Empty

In the example to be described, it is assumed that the TLB is empty. With the TLB empty, the valid bits in each entry indicate invalid and the eviction pending bits in each entry are reset to 0 to indicate no pending evictions. In addition, the buffer is assumed to be empty and therefore the valid bits in the tag array indicate invalid. With these starting assumptions, the I-unit supplies virtual operand address into the operand register 34. The contents of the OAR register 34 are stored into one of the address storage registers (ASR's), for example, register 80. In the first access, the address in register 34 goes to the operand array 29 and in particular addresses the TLB 29-4. The comparator 63 looks for a match. Since the TLB is empty, the result of the match indicates that there is no valid TLB entry and an invalid indication is latched into the OP status register 70. The control logic 49 examines the contents of the status register 70 and upon receiving the invalid indication, initiates a translation process. The translation process is the well-known virtual-to-real translation process defined in the IBM System/370 Principles Of Operation.

When the translation is complete, the virtual address from register 80 is returned to the OAR 34 and the second access addresses the operand array 29 and particularly the TLB 29-4. The results of the translation are written into the TLB at the address location specified by the address in the OAR 34. Specifically, the segment base is written into the segment base field, the logical address is written into the logical address field, and the system address is written into one of the two system address fields, for example, into the System Address 0 (SA0) field. When the system address is written into SA0, the flipper bit is set to 0 and the eviction pending bit for the System Address 0 real address remains reset to 0. Additionally, the valid field is set to mark the new TLB entry valid. When the system address is written into the System Address 0 field, the system address is also entered into a linked list within the reverse translation mechanism in the manner described in the co-pending application, APPARATUS FOR REVERSE TRANSLATION.

In a third access, the logical address from register 80 is again written into the OAR register 34 and again accesses the operand buffer, particularly the TLB 29-4 and the tag array 29-2. In the third access, the comparator 63 finds a TLB match and sets the TLB match indication into the OP Status register 70 to indicate the TLB match. At the same time, the tag comparison results in no match and the tag no match indication is also stored in the OP Status register 70.

Control 49 recognizes the tag no-match indication in the register 70 and initiates a main store access to obtain the requested line of data. Main store accesses the real address location in the manner described in the above-referenced co-pending application, APPARATUS FOR REVERSE TRANSLATION.

After the accessed mainstore data is returned, the fourth access of array 29 occurs and the data is stored into the data array 29-1 at the location specified by the logical address which is again transferred from register 80 to the operand address register 34. At this time, the tags in the tag array 29-2 are written with a pointer which points to the system address field in the TLB containing the system address used to access the data in mainstore. Additionally, the tag is marked valid and the DS tag is written into the tag array 29-3, if required. Further details concerning the DS tag are described in the copending application entitled DATA SELECT TAG, invented by the same inventors as this application, and assigned to the same assignee as the present invention.

In the fifth access of buffer 29, the logical address from the register 80 is transferred to the OAR register 34 and again accesses the operand array 29. At this time, the TLB and the tag both indicate a match. At the time that we get the TLB and tag match, the comparator 62 selects either the primary or alternate data from the data array 29-1 for storage into the OWR register 37.

At this time, the first OP buffer request is complete. If a subsequent Op buffer request is for the same line of data, then only the fifth access is required. Subsequent Op buffer requests for data within the same page as the first Op buffer request but for a different line need only perform the third, fourth and fifth accesses and no explicit virtual-to-real translation is required.

SECOND OPERAND BUFFER REQUEST TO SAME TLB LOCATION AS FIRST REQUEST

In a further example, a new and second buffer request requests access to a location which maps to the same TLB entry as the first Op buffer request.

With the new request, a translation occurs and, as a result of the translation, the validity bit, the segment base, and the logical address can be stored in the same way as described in connection with the first request. However, since the System Address 0 location contains the only identification of the real address location of the corresponding lines resident in the data array 29-1, an eviction process is required in order to remove the lines from the data array, in particular, lines associated with System Address 0 in the example being described.

The eviction process could stop all processing and perform serial searches in the foreground to examine every entry in the tag array and to evict those lines that correspond to the System Address 0. Serial foreground searching, however, has an undesired performance penalty. A preferred implementation, therefore, is to do the eviction processing in the background.

A mechanism is provided which permits the eviction process to be carried out in the background and which permits a new TLB entry to be made. The mechanism uses an additional system address field (SA1 field) along with the SA0 field, a flipper bit to indicate which of two system addresses is the currently active address and two eviction pending bits, one for each system address to indicate eviction pending status of that system address.

Using this mechanism, the TLB entry for the second request can be made as follows. The segment base and the logical address are stored in the same way as described in connection with the first request. Also, the new system address is stored in the other real address location, System Address 1, (SA1), and the flipper bit is set to 1 to indicate that SA1 is the currently active real address. The eviction pending bit for the currently active real address, SA1, remains reset. The eviction pending bit is set for the previously active real address, System Address 0. System Address 0 is thereafter in the eviction pending state and therefore cannot be used until all lines which correspond to that system address in the data array 29-1 have been removed. Until the eviction pending state is released and the System Address field is thereby made available, no further TLB entries can be made at this location.

EVICTION

Pending evictions must be processed in an efficient manner. Failure to remove pending evictions may cause them to accumulate and therefore may cause the processing to stop.

The handling of evictions involves a three-phase process. The three-phase process is to find a system address in the eviction pending state, carry out the eviction, and finally release the eviction pending state for the system address.

In one mechanism for finding evictions, the control 49 monitors each TLB entry accessed. If the eviction pending bits are turned on for an accessed entry, a background eviction process is commenced. This monitoring of accessed TLB entries provides a quasi-random search through the TLB. It is possible that not all locations in the TLB are examined and that eviction pending states may tend to accumulate in addresses that are not often accessed by addresses generated during the processing of the current instruction stream. Therefore, an additional mechanism for finding evictions is provided that guarantees that the entire TLB array will be searched for pending evictions over some period of time. This mechanism takes advantage of cycles which are unused by the CPU. An empty cycle TLB location counter, for example, the Purge TLB counter 68, is maintained. The counter steps through every TLB location in an orderly manner so that every available empty cycle is used to examine the next sequential location.

Under an initial condition, the purge TLB counter 68 is set at some initial count, for example, all zeroes. The counter wraps around at its highest address to the lowest address so the starting point of the counter is not important. The pure TLB counter 68 is an 8-bit counter so that it can access each one of the 256 sets of locations in the TLB. Counter 68 can be any size large enough so that every address in the TLB eventually is accessed as a result of the counter operation.

Whenever the priority mechanism 201 has no other request requesting access to the OAR 34, it selects the address from the purge TLB counter 68 through the incrementer 200. The same address is then clocked into the purge TLB register 68. The address in OAR 34 is used to address the TLB for the purpose of examining the status of the eviction pending bits. The examination is carried out in the same way as any other access to the TLB. In this way, otherwise unused OAR cycles are used to linear search the TLB for pending evictions. The combination of the empty cycle counter accesses and of the instruction processing accesses provides a two-pronged search of the TLB for finding pending evictions.

The actual find process for finding a pending eviction is carried out as follows. Each address for accessing buffer 29 comes into the OAR register 34 and, among other things, addresses the TLB 29-4. The addresses entered into the OAR 34 can come either from the current instruction stream or they can come from the purge TLB counter 68. The eviction pending bits accessed from the TLB are examined by the control 49. If control 49 finds an eviction pending bit on and if the eviction controller is available, then an eviction process is initiated. The eviction controller is marked busy and the eviction register 78 is loaded with the TLB pointer (pointing to the pending eviction) from the OAR register 34. The 10-bit pointer address indicates which system address requires an eviction.

Now that the eviction pending has been found, the actual eviction process must be performed. The eviction control does a sequential search of the tag array using the duplicate set of tags so it doesn't interfere with the foreground processing. For every tag accessed, if the TLB pointer in the tag matches the TLB pointer held by the eviction controller, a move-out is initiated. The move-out operation either discards the data or moves it to mainstore. The result is removal of the line from the buffer.

In order to carry out the eviction, the address in the eviction register 78 is gated into the T2 AR register 35 through the conditional incrementer 58 which appends low-order zeroes. The contents of register 35 are subsequently stored into register 78. The register 35 accesses the tag2 array 27, searching for entries which point to the system address being evicted. The TLB pointer from the tag array 27 and the TLB pointer in the tag 2 register 35 are compared in comparator 60 and the results are stored in the T2 status register 100. If the results indicate a match, control 49 causes the data to be moved out from the buffer and updates mainstore with the data moved out, if required. If the status in register 100 indicates no match, or after the move-out is complete, the address from register 78 is incremented through incrementor 58 to form a new address in register 35 which in turn is stored in register 78. At this time, the process repeats until all possible locations in the tag have been processed. At this time, the buffer has been cleared of all lines to be evicted and the eviction is complete. The system address field can now be released from the eviction pending state by resetting the eviction pending bit.

The release mechanism operates as follows. The TLB pointer in the register 78 is selected into the OAR register 34 and addresses the TLB 29-4 and the system address which initiated the process has its eviction pending bit reset. When the eviction pending bit is reset the system address will be deleted from a linked list in the reverse translation mechanism as described in the copending application entitled APPARATUS FOR REVERSE TRANSLATION, referenced above. When the eviction pending bit is reset, the system address entry thereafter becomes available for reuse.

At this time, additional requests can be processed in the manner previously described for the first and second requests. The eviction pending states will be monitored and evictions made in the background in the manner described.

What is claimed is:

1. A memory unit for use in a data processing system having both virtual memory address space and real memory address space where the data processing system specifies memory locations with logical addresses where the logical addresses are either real addresses or virtual addresses, the memory apparatus comprising,
    a virtual store having a virtual address space directly addressed by virtual addresses without need to translate the virtual address to real address,
    a real store having a real address space addressed by real addresses,
    a virtual-to-real translator for translating virtual addresses to provide real addresses,
    a real-to-virtual address translator for translating real addresses to virtual addresses,
    control means for causing said virtual-to-real translator to provide a translation whenever a real address corresponding to a virtual address is required for addressing the real store and causing said real-to-virtual translator to provide a translation whenever a virtual address corresponding to a real address is required for addressing the virtual store.

2. A memory unit for use in a data processing system having both virtual memory address space and real memory address space where the data processing system specifies memory locations with logical addresses where the logical addresses are either real addresses or virtual addresses, the memory apparatus comprising,
    a virtual store having a virtual address space directly addressed by virtual addresses without need to translate the virtual address to real address, including at each location a tag field and a corresponding data field, said tag field for storing tags identifying virtual addresses resident in said virtual store,
    a real store having a real address space addressed by real addresses,
    a virtual-to-real translator for translating virtual addresses to provide real addresses, said translator including a translation lookaside buffer for storing real addresses corresponding to virtual addresses,
    a real-to-virtual address translator for translating real addresses to virtual addresses,
    control means for causing a real address to be accessed from said translation lookaside buffer and, if unavailable in said buffer for causing said virtual-to-real translator to provide a translation whenever a real address corresponding to a virtual address is required for addressing the real and for causing said real-to-virtual translator to provide a translation whenever a virtual address corresponding to a real address is required for addressing the virtual store,
    a comparator for comparing the tags stored in said tag field of said virtual store with a tag field in the virtual address from the data processing system to provide a data match signal to access the virtual store when the virtual address location is resident in said virtual store.

3. A memory unit for use in a data processing system having both virtual memory address space and real memory address space where the data processing system specifies memory locations with logical addresses where the logical addresses are either real addresses or virtual addresses, the memory apparatus comprising,
    a virtual store having a virtual address space directly addressed by virtual addresses without need to translate the virtual address to real address, a virtual address register for providing virtual addresses to address said virtual store,
    a real store having a real address space addressed by real addresses,
    a real address register for providing real addresses to address said real store,
    a virtual-to-real translator for translating virtual addresses in said virtual address register to provide real addresses in said real address register,
    a real-to-virtual address translator for translating real addresses in said real address register to provide virtual addresses in said virtual address register,
    control means for causing said virtual-to-real translator to provide a translation whenever a real address corresponding to a virtual address is required for addressing the real store or causing said real-to-virtual translator to provide a translation whenever a virtual address corresponding to a real address is required for addressing the virture store.

4. The memory unit of claim 3 wherein said virtual store includes at each location a tag field and a corresponding data field, said tag field for storing tags identifying addresses resident in said virtual store and wherein said virtual address register includes a first field identifying the address of requested locations in the virtual store and includes a second field for identifying tags, said memory unit further including a comparator for comparing the tags stored in said tag field of said virtual store with said second field in the virtual address register to provide a data match signal when the virtual address location is resident in said virtual store.

5. The memory unit of claim 4 wherein said first and said second fields overlap.

6. The memory unit of claim 4 including means responsive to the absence of a data match signal for getting a real address from said virtual-to-real translator to said real address register for addressing said real store.

7. The memory unit of claim 4 including means for storing data into said virtual store at a virtual address corresponding to a real address in said real address register, means for enabling said real-to-virtual address translator to provide one or more of said virtual addresses corresponding to the real address in said real address register.

8. The memory unit of claim 7 including means for moving out data from said virtual store at any virtual addresses provided by the real-to-virtual translator in response to a move-in of data at the real address in said real address register.

9. The memory unit of claim 7 including means for setting validity bits in each of the virtual addresses provided by said real-to-virtual translator in response to a move-in of data at a real address in said real address register.

10. A memory unit for use in a data processing system having both real memory address space and virtual memory address space where the data processing system specifies memory locations with logical addresses where the logical addresses are either real addresses or virtual addresses, the memory apparatus comprising, a virtual buffer store having a virtual address space directly addressed by virtual addresses without need to translate the virtual address to real address, said virtual buffer store having a buffer store capacity for storing data and operating at a buffer store speed, a virtual address register for providing virtual addresses to address said virtual buffer store, a real main store directly addressed by real addresses, said real main store having a main store capacity, greater than said buffer store capacity, and operating at a main store speed less than said buffer store speed, a virtual-to-real translator for translating virtual addresses to provide real addresses, a real address register for providing real addresses to address said real main store, a real-to-virtual address translator for translating real addresses to virtual addresses, control means for causing said virtual-to-real translator to provide a translation whenever a real address corresponding to a virtual address is required for addressing the real main store and causing said real-to-virtual translator to provide a translation whenever a virtual address corresponding to a real address is required for addressing the virture buffer store.

11. The memory unit of claim 10 wherein said virtual buffer store includes at each location a tag field and a corresponding data field, said tag field for storing tags identifying virture addresses resident in said virtual buffer store and wherein said virtual address register includes a first field identifying the address of requested locations in the virtual buffer store and includes a second field for identifying tags, said memory unit further including a comparator for comparing the tags stored in said tag field of said virtual buffer store with the content of said second field in the virtual address register to provide a data match signal when the virtual address location is resident in said virtual buffer store.

* * * * *